Oct. 19, 1948.  R. F. WILD  2,452,023
SAFE FAILURE MEASURING AND CONTROLLING APPARATUS
Filed March 15, 1947  6 Sheets-Sheet 1

INVENTOR.
RUDOLF F. WILD
BY Arthur H. Swanson
ATTORNEY.

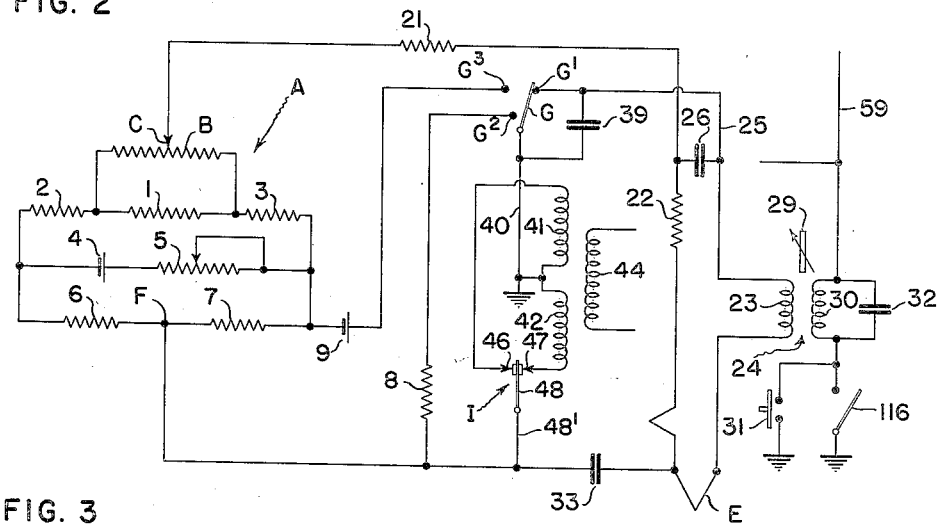

Oct. 19, 1948.    R. F. WILD    2,452,023
SAFE FAILURE MEASURING AND CONTROLLING APPARATUS
Filed March 15, 1947    6 Sheets-Sheet 3

INVENTOR.
RUDOLF F. WILD
BY Arthur H. Swanson
ATTORNEY.

Oct. 19, 1948.                R. F. WILD                    2,452,023
                SAFE FAILURE MEASURING AND CONTROLLING APPARATUS
Filed March 15, 1947                                   6 Sheets-Sheet 4
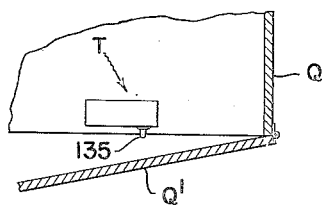
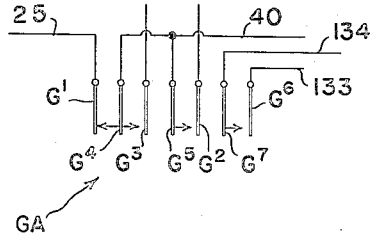
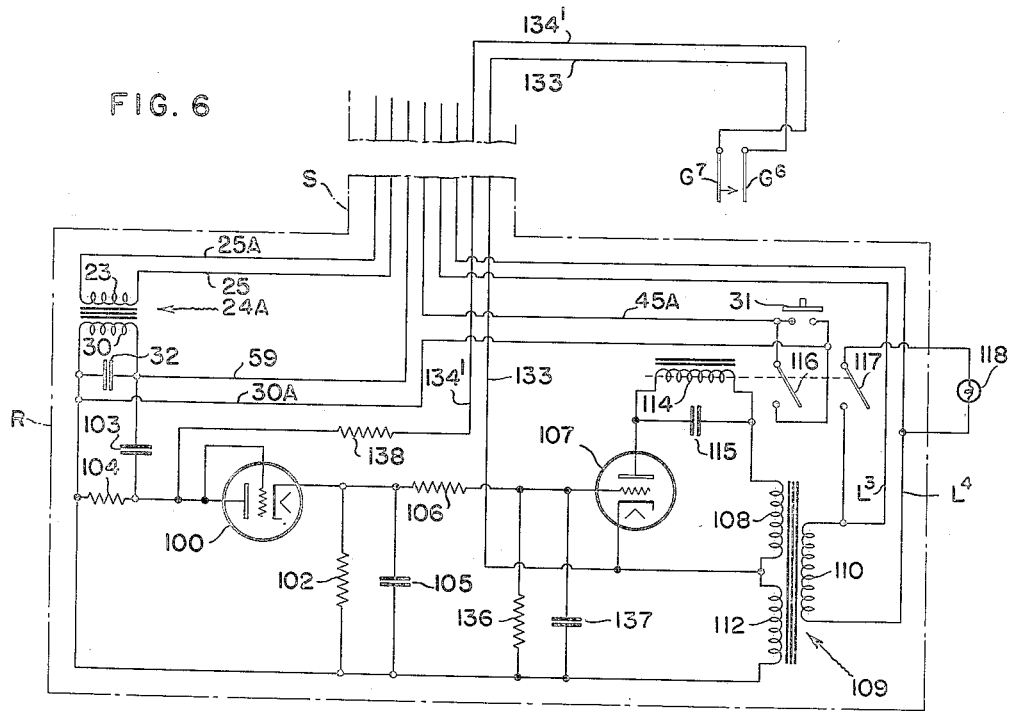
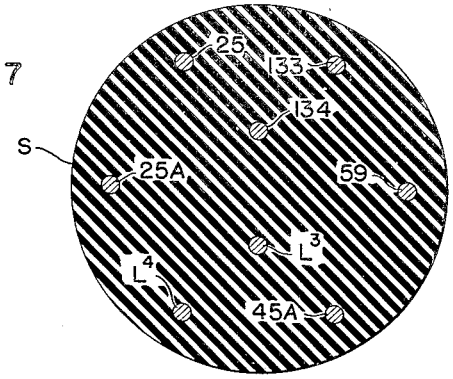
INVENTOR.
RUDOLF F. WILD
BY Arthur H. Swanson
ATTORNEY.

Oct. 19, 1948.                       R. F. WILD                       2,452,023
                    SAFE FAILURE MEASURING AND CONTROLLING APPARATUS
Filed March 15, 1947                                              6 Sheets-Sheet 5

INVENTOR.
RUDOLF F. WILD
BY Arthur H. Swanson
ATTORNEY.

Oct. 19, 1948.                R. F. WILD                2,452,023
             SAFE FAILURE MEASURING AND CONTROLLING APPARATUS
Filed March 15, 1947                              6 Sheets-Sheet 6
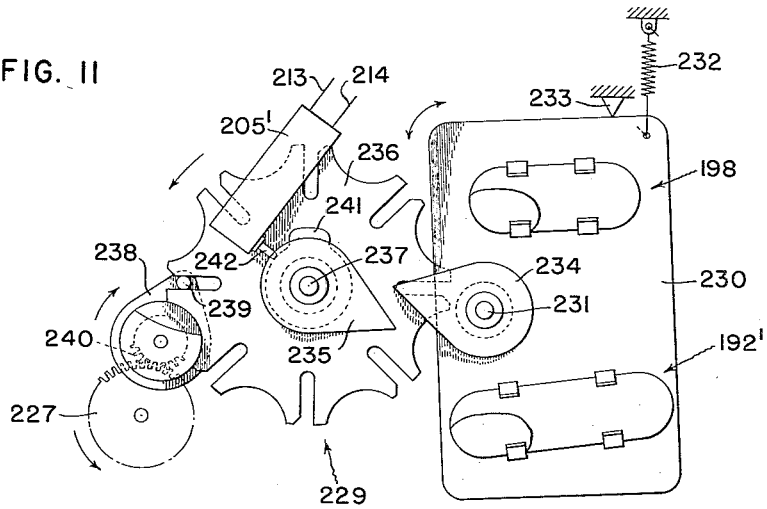
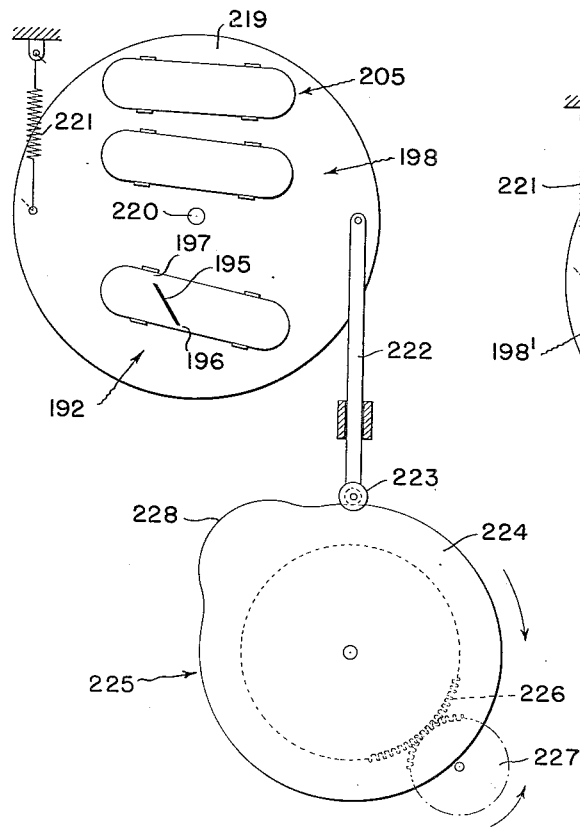
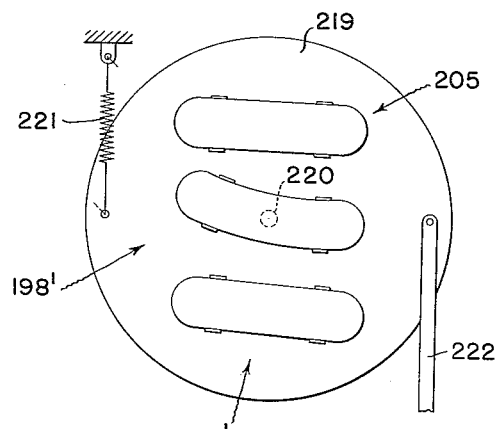
*INVENTOR.*
RUDOLF F. WILD
BY *Arthur H. Swanson*
ATTORNEY.

Patented Oct. 19, 1948

2,452,023

UNITED STATES PATENT OFFICE 2,452,023

SAFE FAILURE MEASURING AND CONTROLLING APPARATUS

Rudolf F. Wild, Philadelphia, Pa., assignor to The Brown Instrument Company, Philadelphia, Pa., a corporation of Pennsylvania Application March 15, 1947, Serial No. 735,009

42 Claims. (Cl. 318—28)

The present invention relates to measuring and control apparatus of the type comprising electronic amplifying means through which variations in a minute voltage being measured control the operation of mechanism employed to effect operations on and in accordance with variations in said voltage. Such apparatus may be of widely divergent forms. For example, it may comprise an integrator actuated through an electronic amplifier by a millivoltmeter, or it may be a self-balancing potentiometer including an electronically controlled rebalancing motor.

The general object of the invention is to provide improved means for detecting the inability of the apparatus of the above-mentioned type to function properly as a result of any one of a variety of apparatus defects. In a desirable form of embodiment in self-balancing potentiometric measuring and control apparatus, the invention is used to detect the operative failure of the potentiometric measuring circuit, of the thermocouple connected to said circuit, of any one of the input voltage and power transformers, of the electronic amplifying valves, or of the rebalancing motor itself. In practice the said detecting means is associated in a protective mechanism for the measuring and control apparatus with means for the actuation of an alarm or the production of some other control effect on the detection of an apparatus defect.

The invention claimed herein is characterized by the utilization of the amplifying system of the apparatus in creating a high frequency, oscillating current which is used to indicate the occurrence of an apparatus failure, and which is ordinarily used for the "safe failure" purpose of producing a control effect to minimize the injurious consequences of the apparatus failure. In the embodiment of the invention mentioned above, a high frequency current flow is maintained while the potentiometer is in normal operation, and is interrupted when the potentiometer ceases to be normally operative, and the interruption results in actuating a signal and in interrupting the operation of the rebalancing motor. If desirable, the control effect resulting from apparatus failure may be made to cause a shut-down of the controlled process by shutting off the supply of fuel to a furnace, for example. However, in certain processes, particularly those of the oil refining industry, it is not desirable to shut-down the operation of the system upon failure of the control apparatus. Instead, it is desirable to provide either visible or audible indication, or both, upon such control apparatus failure, and to deprive the faulty apparatus of control of the process so that an operator can take over manual control of the process and manually maintain it in operation, thereby avoiding the waste of time and materials which occurs if such a process is shut-down before its completion. Also, if desirable and practically necessary, suitable stand-by apparatus may be provided which will automatically be connected to the system to replace components which have failed, as is disclosed and claimed in my prior application, Serial No. 678,255, filed June 21, 1946, of which the instant application is a continuation in part.

Measuring and control apparatus, of the type to which the present invention relates, usually includes an electrical measuring circuit in which an approximately constant energizing current flow through a resistance is normally maintained, and also includes standardizing apparatus for varying a regulating resistance in series with the battery or other source of circuit energizing current, as required to compensate for the deterioration of the battery with age, or for other variations in the performance of the source of current. For reasons hereinafter explained, the response of the protective mechanism to the interruption of the high frequency current flow during a standardizing operation is undesirable, and a specific object of the present invention is to provide simple and effective means for rendering the protective mechanism inoperative to respond during standardization to defects to which it should respond in the normal operation of the apparatus. A still more specific object of the invention is to provide means for so rendering the protective mechanism inoperative during standardization periods which will also produce a definite delay in the response of the protective mechanism to a defect existing during a period of normal operation.

A measuring and control apparatus unit of the type with which my improved protective apparatus will ordinarily be used is customarily in the form of an instrument unit enclosed in an instrument casing or housing, and a specific object of the present invention is to provide a protective mechanism unit enclosed in a casing or housing separate from the instrument housing and operatively connected to the apparatus within the instrument housing by a cable incorporating conductors which connect cooperating apparatus elements in the two casings. My novel protective mechanism unit may be operatively connected to an existing measuring and control instrument, constructed and originally put into use without protective mechanism, without changes in the latter other than a few simple and readily effected circuit changes. A further specific object of the present invention is to provide measuring and control apparatus of the type specified with improved standardizing provisions.

The present invention is further characterized by the relatively few and simple changes and additions required for the use of the present invention in self-balancing potentiometers including electronic amplifying apparatus of a conversion type now in extensive use.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 2 is a simplified diagram illustrating characteristic features of the arrangement shown in Fig. 1;

Fig. 3 is a diagram illustrating a modification of the oscillation detecting circuit portion of the apparatus shown in Fig. 1;

Fig. 4a is a section illustrating a structural feature which may be included in the instrument shown diagrammatically in Fig. 4;

Fig. 5 is a view illustrating a modification of the switch mechanism shown in Figs. 4 and 4a;

Fig. 6 is a diagram illustrating a modification of the protective mechanism shown in Fig. 4;

Fig. 7 is a section of the cable shown in Figs. 4 and 6;

Figs. 9, 10 and 11 illustrate in detail portions of the apparatus of Fig. 8.

Figure 1:
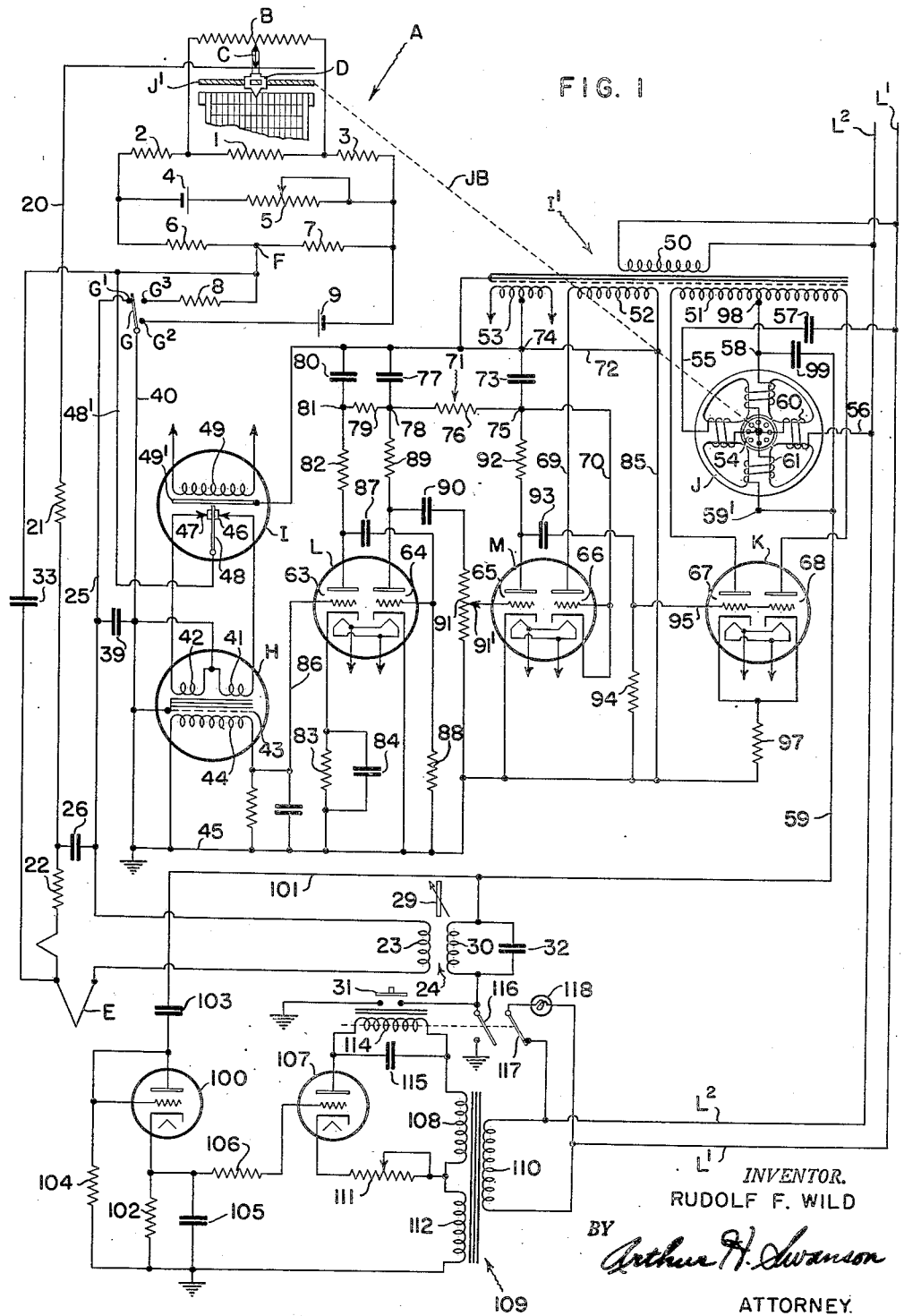
Fig. 1 is a diagrammatic representation of potentiometric apparatus including my improved means for producing a control action on the failure of various apparatus elements.

In Fig. 1, I have diagrammatically illustrated the use of the present invention in potentiometric measuring and control apparatus of the so-called conversion type disclosed in the prior application of Walter P. Wills, Serial No. 421,173, filed December 1, 1941, now Patent No. 2,423,540 issued July 8, 1947. In the apparatus shown, the potentiometric rebalancing operations are effected by a reversible electric motor J, and an automatic control system which controls the operation of the motor J, and includes an electronic amplifier and means comprising a pulsator I, and a transformer H cooperating to impress on the electronic amplifier an alternating control voltage varying in magnitude and phase with the magnitude and direction of potentiometric bridge unbalance, produced by variations in the output of the thermocouple E which is the source of a small D. C. voltage.

The apparatus shown diagrammatically in Fig. 1 comprises a potentiometric bridge circuit A including a slide wire resistance B along which a slider contact C is adjusted through a shaft J' which is rotated by the motor J through a mechanical adjusting element JB, and is in threaded engagement with the pen carriage D carrying the contact C. The potentiometric bridge circuit A is shown as being of conventional type comprising one branch including series connected resistances 1, 2 and 3, an energizing branch connected in parallel with the first mentioned branch and including a source of current 4 and a regulable resistance 5 connected in series, and a third branch connected in parallel wtih the energizing branch and with the first mentioned branch and including series connected resistances 6 and 7. The slide wire resistance B is connected in parallel with the resistance 1 between and in series with the resistances 2 and 3.

Associated with the bridge circuit A is a standardizing switch. The latter, as conventionally shown, comprises a movable two-position switch member G and switch contacts G', $G^2$ and $G^3$. In the normal operating position of the switch member G, it engages the contact G' and connects the thermocouple E between the slider contact C and the junction point F of the bridge resistances 6 and 7. In its recalibrating position, the switch member G engages and forms a bridge connection between the contacts $G^2$ and $G^3$ and thereby connects a resistance 8 and a standard cell 9 in series with the bridge resistance 7. In respect to its features just specifically mentioned, the apparatus shown diagrammatically in Fig. 1 does not differ significantly from the apparatus shown in said prior Wills application.

As shown, the circuit branch connecting slider contact C and bridge point F includes in series between the contact C and switch contact G', the thermocouple E, conductor 20, resistances 21 and 22, the secondary winding 23 of a transformer 24, and a conductor 25. The circuit elements 22, E and 23 are shunted by a condenser 26. The transformer 24 couples the input and output circuits of the electronic amplifying and control system shortly to be described. The transformer 24 has an iron core 29 which may be adjusted to vary the magnitude of the feed-back, or regenerative effect transmitted to said input circuit. The primary winding 30 of transformer 24 has one terminal connected by conductor 59 to one terminal 59' of the control winding 61 of the motor J. The second terminal of the primary winding 30 is connected to ground on the closure of a starting switch 31. When, after the apparatus is thus started into normal operation, the starting switch is opened, the ground connection to the winding 30 is maintained by a relay switch 116 associated with the high frequency current detection circuit shown in Fig. 1 and hereinafter described. A condenser 32 is connected in parallel with the primary winding 20. The terminal of the thermocouple E connected to the resistance 22 is directly connected to the bridge point F by a condenser 33.

The circuit connection between the switch contact G' and the bridge point F, closed by the movement of the switch member G into engagement with the contact G', includes a conductor 40 connecting the switch member G to the midpoint of the two sections 41 and 42 of the primary winding of the transformer H. A condenser 39 connects the conductors 40 and 25 for a purpose hereinafter explained. The core structure and casing of the transformer H and a shield 43 interposed between the transformer primary windings and its secondary winding 44 are connected to a grounding conductor 45. The latter is also connected to the junction point of the primary winding sections 41 and 42. The remote ends or terminals of the primary winding sections 41 and 42 are connected to the stationary contacts 46 and 47 respectively of the vibrator I. The latter comprises a vibrating reed 48 carrying a contact moved by the vibration of the reed back and forth between the contacts 46 and 47 which it alternately engages.

The vibrating contact 48 is connected by conductor 48' to the bridge point F. The reed 48 is caused to vibrate by a winding 49 having its terminals connected to a source of alternating current. A permanent magnet 49', connected to ground, is associated with the reed 48 for polarizing and synchronizing purposes, and in operation the reed 48 is in continuous vibration with a frequency corresponding to that of the source of energization for the winding 49. In consequence, the currents flowing alternately through the winding sections 41 and 42 create alternating voltages in the secondary winding 44 well adapted for amplification in the electronic relay to the input terminals of which the terminals of the transformer secondary winding 44 are connected.

Said electronic relay comprises a drive section and an amplifying section, both of which receive energizing current from a transformer I' having its primary winding 50 connected to the supply conductors L' and L² and having three secondary winding sections 51, 52 and 53. The drive section of the electronic relay comprises the reversibly rotating motor J and an electronic tube K. The amplifying section comprises amplifying tubes L and M.

The motor J, as diagrammatically shown, comprises a rotor 54 mechanically coupled to the threaded shaft J', the rotation of which, as diagrammatically shown, simultaneously adjusts the contact C and the pen carriage D. The motor J has a pair of terminals 55 and 56 connected through a condenser 57 of suitable value to the alternating supply conductors L' and L², and has a second pair of terminals 58 and 59'. The terminal 58 is connected to the midpoint 98 of the secondary winding 51, and terminal 59' is connected to ground through the conductor 59 and the primary winding 30 of the transformer 24 when either of switches 31 and 116 is closed. For its intended use, the motor J may be of the form schematically shown in the drawings in which one pair of oppositely disposed field poles is surrounded by a winding 60 connected between the motor terminals 55 and 56, and the other pair of poles is surrounded by a winding 61 connected between the motor terminals 58 and 59'.

Since the value of the condenser 57 is so chosen as to produce with the winding 60 a series resonant circuit, the current flowing through the motor winding 60 will be approximately in phase with the voltage of the alternating supply conductors L' and L². The current supply to the winding 61 will either lead or lag the voltage of the alternating current supply conductors L' and L² by approximately 90°. The windings 60 and 61 thus establish fields in the motor J which are displaced from one another approximately 90° in one direction or the other, depending upon whether the winding 61 is energized with current which leads or lags the voltage of the alternating supply conductors L' and L². As will become apparent from the subsequent description, the phase of the current flow through the winding 61 and the rotation of the rotor 54 depends upon, and is controlled by, the direction of unbalance of the potentiometric measuring circuit, and the duration of said rotation depends on the duration of said unbalance so that the rotation of the rotor 54 tends to adjust the contact C to the extent as well as in the direction to rebalance said circuit.

The alternating voltage generated in the secondary winding 44 of the transformer H is amplified through the action of the amplifying tubes L and M and the amplification thus effected is utilized in energizing the phase winding 61 of the motor J to control the selective actuation of the latter for rotation of the rotor 54 in one direction or the other.

As shown, the electronic amplifying tube L includes two heater type triodes within the same envelope and designated by the reference symbols 63 and 64. The triode 63 includes anode, control electrode, cathode, and heater filament elements, and the triode 64 includes like elements. The filaments of the triodes 63 and 64 are connected in parallel and receive energizing current from the low voltage secondary winding 53 of the transformer I'. The conductors through which the secondary 53 supplies current to the heater filaments of the electronic tube L and also to the heater filaments of the tubes M, K, 100, and 107 have not been shown in order not to confuse the drawings.

The electronic amplifying tube M includes two heater type triodes, designated by the reference characters 65 and 66, and within the same envelope. Both of the triodes of tube M include anode, control electrode, cathode and heater filament elements. The electronic tube K also includes two heater type triodes, which have been designated by the reference characters 67 and 68, within the same envelope, and which include anode, control electrode, cathode, and heater filament elements.

The triode 66 of the electronic valve M is utilized as a half-wave rectifier to provide a source of direct current voltage for energizing the anode or output circuits of the triodes 63, 64 and 65. As shown, the control electrode and cathode of the triode 66 are directly connected to each other, and the output circuit thereof is energized by the transformer secondary winding 52 through a circuit which may be traced from the left end terminal of the winding 52, as seen in the drawings, through the conductor 69 to the anode of the triode 66, the cathode thereof, and through a conductor 70 to the positive input terminal 75 of a filter generally designated by the reference numeral 71. The negative terminal 74 of filter 71 is connected by a conductor 72 to the right end terminal of the transformer secondary winding 52 which in turn is connected through the conductor 85 to the grounded conductor 45.

The filter 71 includes a condenser 73 which operates to smooth out the ripple in the output voltage of the filter between the points 74 and 75. The filter 71 also includes a resistance 76 and a condenser 77 which operate to smooth out the output voltage of the filter between the points 74 and 78. The filter 71 includes a further resistance 79 and a condenser 80 for smoothing out the output voltage between the filter points 74 and 81. The filter, therefore, comprises three stages. Such a three-stage filter is provided because for satisfactory and efficient operation it is desirable that the anode voltage supplied to the triode 63 be substantially free from ripple whereas it is not necessary to supply anode voltage so completely free from ripple to the output circuit of the triode 64. Likewise it is not necessary to supply anode voltage as free from ripple to the triode 65 as to the triode 64.

The anode circuit of the triode 63 may be traced from the filter point 81, which comprises the positive output terminal of the filter, through a fixed resistance 82 to the anode of the triode 63, to the cathode thereof, and through a cathode biasing resistance 83, which is shunted by a condenser 84, to the negative filter point 74 through the previously mentioned grounded conductor 45, the conductor 85 and the conductor 72. The cathode biasing resistance 83 and the parallel connected condenser 84 are utilized for biasing the control electrode of the triode 63 negatively with respect to its associated cathode.

The input circuit of the triode 63 may be traced from the cathode to the parallel connected resistance 83 and condenser 84, through the transformer secondary winding 44, and through a conductor 86 to the control electrode of the triode 63.

The output circuit of the triode 63 is resistance-capacity coupled to the input circuit of the triode 64 by means of a condenser 87 and a resistance 88. More particularly, the anode of the triode 63 is connected by condenser 87 to the control electrode of the triode 64, and the control electrode of the triode 64 is connected through the resistance 88 to the grounded conductor 45 and thereby to the grounded cathode of the triode 64. The anode circuit of the triode 64 may be traced from the positive terminal 78 of the filter 71 through a fixed resistance 89 to the anode of the triode 64, the cathode thereof, and conductors 45, 85 and 72 to the negative terminal 74 of the filter.

The output circuit of the triode 64 is resistance-capacity coupled to the input circuit of the triode 65 by means of a condenser 90 which is connected between the anode of the triode 64 and the control electrode of the triode 65, and by means of a resistance 91 which is connected between the control electrode of the triode 65 and the grounded cathode thereof. It is noted that the resistances 88 and 91 which are connected to the input circuits of the triodes 64 and 65, respectively, operate to maintain the control electrodes of the triodes 64 and 65 at the same potentials as their associated cathodes when no voltage is induced in the transformer secondary winding 44, but upon the induction of an alternating voltage in the secondary winding 44, resistances 88 and 91 permit the flow of grid current between the control electrodes of the triodes 64 and 65 and their associated cathodes and thereby limit the extent to which the control electrodes of these triodes are permitted to go positive with respect to their associated cathodes. With the control electrode of triode 65 connected to the resistance 91 by an adjustable contactor 91', as shown, said resistance and contactor form a means for varying the amount of signal impressed on the control electrode of the triode 65 from the plate circuit of the triode 64.

The anode circuit of the triode 65 may be traced from the positive terminal 75 of the filter 71 through a fixed resistance 92 to the anode of the triode 65, the cathode thereof, and conductors 85 and 72 to the negative terminal 74 of the filter. The output circuit of the triode 65 is resistance-capacity coupled to the input circuits of the triodes 67 and 68 by means including a condenser 93 and a resistance 94.

As illustrated the condenser 93 is connected between the anode of the triode 65 and a conductor 95, which in turn is connected to the control electrodes of the triodes 67 and 68, and the conductor 95 is also connected to the cathodes of those triodes through the resistances 94 and 97. Specifically, the resistance 94 is connected between the conductor 95 and ground, and the resistance 97 is connected between the cathodes of the triodes 67 and 68 and ground. The resistance 94 limits the extent to which the control electrodes of the triodes 67 and 68 may be driven positive with respect to their associated cathodes.

A voltage is supplied the output circuits of the triodes 67 and 68 from the high voltage secondary winding 51 of the transformer I'. The anode of the triode 67 is connected to the left end terminal of the transformer secondary winding 51 and the anode of the triode 68 is connected to the right end terminal of the transformer secondary winding 51. The cathodes of the triodes 67 and 68 are connected together and through the fixed resistance 97 to ground, and the terminal 59' of the motor J is also connected to ground through the transformer winding 30 and the switches 31 and 116 as previously explained. The terminal 58 of the motor J is connected to the center tap 98 on the transformer secondary winding 51. Thus, the triodes 67 and 68 are utilized for supplying energizing current from the transformer secondary winding 51 to the phase winding 61 of motor J.

The motor J is preferably so constructed that the impedance of the circuit including the condenser 99 and the winding 61 is of the proper value to match the impedance of the anode circuits of the triodes 67 and 68 when the motor is operating in order to obtain the most efficient operation. Preferably, the motor is so constructed that it has a high ratio of inductance to resistance, for example, of the order of 6-1 or 8-1 at the frequency of the energizing current supplied to it. This provides for maximum power during the running condition of the motor with the least amount of heating, and also provides a low impedance path for braking purposes.

As noted hereinbefore, energizing current is supplied to the motor winding 60 from the alternating current supply conductors L' and L² through the condenser 57. As previously explained, the condenser 57 is so selected with respect to the inductance of the motor winding 60 as to provide a series resonant circuit having a unity power factor. By virtue of the series resonant circuit, the total impedance of the motor winding 60 is substantially equal to the resistance of the winding, and since this resistance is relatively low, a large current flow through the winding 60 is made possible. This permits the attainment of maximum power and torque from the motor J. In addition, the current flow through the motor winding 60 is in phase with the voltage of the alternating current supply conductors L' and L² because of the series resonant circuit. The voltage across the motor winding 60, however, leads the current by substantially 90° because of the inductance of the winding 60.

Energizing current is supplied the motor winding 61 from the transformer secondary winding 51 through the anode circuits of the triodes 67 and 68 through the circuits previously traced. A condenser 99 is connected in parallel with the motor winding 61 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 67 and 68, and accordingly, provides efficient operation. The relatively low internal circuit impedance approximates the actual resistance of the winding 61, and since this resistance is relatively low, the impedance of the local circuit is also relatively low.

For the first half cycle of the alternating voltage produced across the terminals of the transformer secondary winding 51, the anode of the triode 67 is rendered positive with respect to the center tap 98, and during the following half cycle the anode of the triode 68 is rendered positive with respect to the center tap. Accordingly, the triodes 67 and 68 are arranged to conduct on alternate half cycles of the alternating current supplied by the supply conductors L' and L².

When no signal is impressed upon the control electrodes of the triodes 67 and 68, pulsating unidirectional current of twice the frequency of the alternating voltage supplied by conductors L' and L² is impressed on the motor winding 61. When thus energized the motor J is not urged to rotate in either direction but remains stationary. Due to the relatively high direct current component of the current then flowing through the motor winding 61, the core structure of the motor winding J tends to become saturated whereby the inductive reactance of the motor winding 61 is made relatively small. The value of the condenser 99, in shunt to the motor winding 61, is so chosen that the condenser and motor winding then provide a parallel resonant circuit. This saturation of the core structure of the motor J operates to exert an appreciable damping effect on the rotor 54, or in other words, an effect tending to prevent rotation of the rotor 54. Consequently, if the rotor 54 has been rotating, saturation of the motor core structure operates to quickly stop the rotation.

When an alternating signal voltage is impressed on the control electrodes of triodes 67 and 68, the magnitude of the pulses of current flowing in the anode circuit of one triode 67 or 68 will be increased while the magnitude of the pulses of current flowing in the anode circuit of the other triode 68 or 67 will be decreased. Accordingly, the pulses of unidirectional current supplied to the motor winding 61 during the first half cycle will predominate over those supplied to the motor winding during the second half cycle. Which anode current will be increased depends upon whether the signal voltage is in phase or 180° out of phase with the voltage of supply conductors L' and L².

Such energization of the motor winding 61 operates to introduce therein an alternating component of current of the same frequency as that supplied by the alternating current supply conductors L' and L². This alternating component of current will either lead or lag the alternating current flowing through the motor winding 60 by approximately 90° depending upon which of the triodes 67 and 68 has its anode current increased by the prevailing grid signal voltage, and with either phase relation the two currents produce a magnetic field in the motor core structure which rotates in one direction or the other, depending upon said current phase relation, and effects rotation of the motor rotor 54 in the corresponding direction. Moreover, when the motor winding 61 is so energized, the direct current component of the current flowing therein is decreased, and consequently, the saturation of the motor core structure is decreased with the result that the rotor damping effect is reduced.

When the tmeperature of the thermocouple E is steady and the positions of the pen carriage D and the contact C are correct for that temperature, no signal potential is transmitted to the controlling electrodes of the triodes 67 and 68 by the anode circuit of the triode 65. Since the grid signal potential is then zero, the rotor 54 of the motor J has no tendency to rotate. Upon an increase in the temperature of the thermocouple E, a signal potential will be applied to the control electrodes of the triodes 67 and 68 by the anode circuit of the triode 65 which will result in rotation of the motor J in a direction to move the pen carriage D up-scale. Conversely, upon a decrease in the temperature of the thermocouple E, a signal potential will be applied to the control electrodes of the triodes 67 and 68 by the anode circuit of the triode 65 which will result in rotation of the motor J in a direction to give the pen carriage D a down-scale adjustment.

With the control winding 61 of the motor J connected to ground through the transformer winding 30 and condenser 32, as shown, the transformer 24 couples the output and input circuits of the electronic amplifying system. The coupling transformer is then operative to transfer energy from the output circuit to the input circuit of the system as required for the maintenance of an oscillating current flow at a frequency determined by the parameters of the coupled circuits. The electronic amplifying and control system shown in Fig. 1 is of a standard and well known type, which has been in extensive use in this country for several years, and typical values of its resistance, inductance, and capacitance elements, and of its energizing voltages, are well known.

For the purposes of the present invention, the precise frequency of the high frequency oscillation current maintained is not critical. Advantageously, however, it is of the order of 15 to 20 kilocycles, in which frequency range the amplifier gain is considerably lower than it is for its normal operating range of 60 cycles. Consequently, the high frequency oscillation does not overload the amplifier, nor significantly interfere with the available amplifier power output. To maintain current oscillations of that frequency in the standard amplifying system shown, the inductance of the primary winding 30 may well be such that the circuit including it and the condenser 32 will be broadly tuned when the capacitance of the condenser 32 is 0.1 microfarad. The mutual inductance of the windings 23 and 30 may be varied by adjustment of the transformer core 29. Appropriate capacitance values for condensers 26, 33, and 39 are 500, 0.1 and 0.5 microfarads, respectively. The resistances 21 and 22 may be 25 and 150 ohms, respectively. The resistance 22 is a damping resistor, and the resistance 21 is employed to minimize the effect of changes in resistance of the potentiometer circuit between the point F and the contact C as the latter is moved along the range of the slide wire resistance B.

Fig. 2 is a simplified showing of the feed back and amplifier inputs from which it is readily appaarent that there are three circuit branches for high frequency current flow connected in parallel to the secondary winding 23 of the coupling transformer 24, namely: the branch including the damping resistor 22, thermocouple E, and condenser 26; the branch including the condenser 26, slider contact C, bridge point F, condenser 33, thermocouple E, and the measuring bridge circuit connecting said contact and point; and the circuit including thermocouple E, condenser 33, conductor 48', vibrator switch 48, transformer primary windings 41 and 42, and switch contact members G and G'.

As Fig. 2 makes clearly apparent, the condenser 39 maintains a high frequency current path of flow through the last mentioned circuit branch during the standardizing operation in which the switch member G is disconnected from the contact member G'. The circuit branch including the damping resistor 22 is of relatively high impedance which does not vary in operation, and proper operation could be maintained even if the value of resistance 22 were materially lower than 150 ohms. The resistance 21 is needed because the resistance of the measuring circuit between the contact C and point F varies quite widely as the contact C is adjusted, and can be quite low when that contact is at one end of its range of movement.

With the standard amplifying and control system shown, the high frequency oscillating current will ordinarily be maintained during alternate half-cycles only of the 60 cycle alternating supply voltage used in energizing the power stage of the system. This is due to the fact that the phasing of the input transformer H changes during each half cycle and one phase only is suitable for generation of high frequency signals. However, if an excessive amount of feed back signal is supplied to the thermocouple input circuit, high frequency oscillations are produced during each half cycle, probably as a result of the capacitance coupling of the windings of the input transformer H.

The amplifying and control apparatus shown in Fig. 1, including the coupling connection between the amplifier input and output circuits previously described, is so proportioned and arranged that in regular use the high frequency signal may be detected in the amplifier output circuit at all times at which the 60 cycle signal impressed on the amplifier input circuit does not exceed its maximum normal operation value, and will disappear when the 60 cycle signal increases above said value.

Any interruption of the high frequency current flow operates through the detector circuit, shortly to be described, to open the switch 116 and thereby prevent further operation of the motor J until the ground connection to the motor winding 81 is re-established.

With the apparatus shown in Fig. 1 in its normal operating condition, the high frequency signal is maintained as well when the potentiometer system is balanced and the motor J is stationary, as when the system is unbalanced and the motor J is revolving in one direction or the other at maximum speed. Moreover the high frequency oscillating current will not be interrupted by the adjustment of the switch member G, or as a result of changes in the thermocouple electromotive force and the resultant rebalancing adjustments of the slider contact C. The high frequency current will be interrupted, however, by the development of any one of numerous defects or failures in the amplifying and control system which will prevent the apparatus from functioning properly.

Thus the high frequency current flow will be interrupted not only on a breakage in the thermocouple, but also when an incipient thermocouple failure results in a substantial increase in the thermocouple resistance. Normally the resistance of the thermocouple is so small as to be negligible in this connection, but in an incipient stage of its failure the thermocouple resistance may increase to one or two hundred ohms before the actual thermocouple breakage occurs. As Fig. 2 makes apparent, such an increase in thermocouple resistance would interrupt the high frequency current flow through all of its paths of flow in the input circuit portion of the amplifying and control system. The high frequency current will also be interrupted on the failure of any of the voltage amplifier tubes, and on the development of any defect in the control system causing any one of the amplifier tubes to be over-driven. Furthermore, any mechanical failure of the motor preventing the latter from rotating will soon interrupt the high frequency current as the resultant measuring circuit unbalance increases so that a 60 cycle voltage signal will be impressed on the amplifier which is large enough to over-drive any one of the amplifier tubes.

The appearance and disappearance of the high frequency signal under different conditions as above described may be explained as follows: In the contemplated use of the apparatus shown in Fig. 1, the high frequency signal rides on top of the normal 60 cycle signal impressed on the amplifying and control system through the transformer H, and is continuously apparent in the amplifier output circuit so long as the amplitude of the 60 cycle signal is within its normal predetermined range. The high frequency signal is clipped or interrupted as a result of cut-off and/or saturation of the plate current in the third stage amplifying triode 65 on an abnormal increase in the 60 cycle signal produced by the development of any of the above mentioned operation defects. The conditions of operation under which the high frequency signal will and will not ride through the amplifier on the 60 cycle signal may be varied by changing the amplitude of either or both of said signals. In ordinary practice, however, the apparatus must be so proportioned and arranged that the maximum normal amplitude of the 60 cycle signal is that required to insure the desired operation characteristics of the rebalancing motor J. It is readily possible, however, to make the amplitude of the high frequency signal such that that signal will be readily detectable in the amplifier output circuit at all times in which the 60 cycle signal is not abnormally high.

In this connection, assume that the apparatus is so proportioned and arranged that with intermediate values of the two signal currents, the high frequency signal will appear in the amplifier output circuit superimposed upon the peak portions of the low frequency signal current.

With apparatus so proportioned and arranged, the extent of increase in the low frequency signal current required to prevent the appearance of the high frequency signal in the output circuit may be increased and decreased by respectively increasing and decreasing the high frequency signal current.

A detector circuit operative to open the switch 116 and, if desired, to actuate a signal on the interruption of the high frequency current, may take various forms. In Fig. 1 I have illustrated the detector circuit which I now consider preferable for use in an arrangement of the type shown in Fig. 1. This detector circuit comprises electronic amplifying and control means for amplifying the high frequency potential difference between the conductor 59 and ground. It also comprises an electromagnetic relay mechanism controlled by said means and operating the previously mentioned switch 116, and, as shown, also operating a signal controlling switch 117.

The detector system of Fig. 1 comprises an electronic valve 100 having its anode and its control electrode connected to the conductor 59 through a branch conductor 101 and a condenser 103, and having its cathode connected to ground through a resistance 102 which may be of two megohms. To suitably minimize the amount of amplification of 60 cycle signal reaching the valve 100, I provide a filter comprising the condenser 103 through which the conductor 101 is connected to the anode of valve 100, and a resistance 104 through which said anode is connected to ground. The condenser 103 may have a capacitance of 2500 micromicrofarads, and the resistance 104 may be 10,000 ohms. As shown, a condenser 105 of 0.05 microfarad is connected in parallel with the resistance 102. The cathode of valve 100 is also connected through a resistance 106, which may well be 0.25 megohm, to the control grid of a second electronic valve 107. The latter is a triode and may be the second of the two valves of a 7N7 tube, the valve 100 being the first valve.

The plate circuit of the valve 107 includes the secondary winding 108 of a transformer 109 which has its primary winding 110 connected to the 60 cycle supply conductors L' and L². One terminal of the secondary winding 108 is connected to the cathode of the valve 107 by a variable resistance 111 having a maximum resistance value which may well be 500 ohms. By varying the amount of the resistance 111 in circuit, the sharpness of the response to the decrease in the high frequency signal may be regulated. A secondary winding 112 of the transformer 109 is employed to raise the potential of the cathode of the valve 107 relative to the ground potential and to the potential of the control grid of the valve 107. The transformer secondaries 108 and 112 may well develop voltages of 225 and 12 volts, respectively.

The plate circuit of the valve 107 includes in series with the transformer secondary 108, the winding 114 of an electromagnetic relay switch mechanism which when energized closes the previously mentioned switch 116 and opens the signal switch 117. As shown, a condenser 115 of 8 microfarads capacity is connected in shunt to the winding 114. The switch 117, when closed, connects the terminals of an alarm, which may be an electric lamp 118 or an eelctric bell, to the supply conductors L' and L². The switch 116 is biased to open its contacts when the winding 114 is deenergized, and the switch 117 is biased to close its contacts when the winding 114 is deenergized.

As those skilled in the art will recognize, the apparatus by which the high frequency feed back signal is introduced into the amplifying and control system may take various forms. In Fig. 3, I have illustrated an input and output coupling arrangement quite different from that shown in Fig. 1. Fig. 3 also shows a modification of the detector system shown in Fig. 1. The apparatus shown in Fig. 3 may be included in apparatus exactly like that shown in Fig. 1, except for difference which are shown in Fig. 3.

In Fig. 3, I make use of a coupling transformer 24A having secondary and primary windings 23 and 30, respectively, and which may be like the transformer 24 of Fig. 1 in all other respects, except that it does not require or include the adjustable core 29 of the transformer 24. The secondary winding 23 of the transformer 24a of Fig. 3 is connected in series with the thermocouple E as in Fig. 1. The connections to the primary winding 30 of Fig. 3 are quite different, however, from those shown in Fig. 1. In Fig. 3, one terminal of the winding 30 is connected to a contact 120 adjustable along a potentiometer resistance 121. The latter may be of 500 ohms, and has one terminal connected to the second terminal of the winding 30 and to ground. The second terminal of resistance 121 is connected through a condenser 122 and a conductor 123 to the amplifying and control system output conductor 59 which in the Fig. 3 arrangement connects the motor winding 61, not shown, to one terminal of a choke coil 124. As shown, the choke coil 124 has its second terminal connected to the starting switch 31 and to the relay switch 116 just as does the corresponding terminal of the winding 30 in the arrangement shown in Fig. 1. In a practically operative embodiment of the form of the invention illustrated in Fig. 3, the values of the condenser 122 and the choke coil 124 are 1000 micro-microfarads and 30 millihenries respectively.

The detector circuit shown in Fig. 3 is in many respects like that shown in Fig. 1, and corresponding detector circuit parts are designated by the same reference symbols in both figures. In Fig. 3, the filter employed to avoid 60 cycle voltage action on the detector includes a second filter condenser 125 interposed between the resistance 106 and the junction between the condenser 103 and the ungrounded end of the resistance 104. The condenser 125 may be of 2500 micro-microfarads capacity. In Fig. 3, the anode of the valve 100 is connected to the control electrode of that valve, and to ground. The cathode of the valve 100 is connected to the junction between the condenser 125 and the resistance 106 and to the control grid of the valve 107 through the resistance 106, as in Fig. 1. The condenser 105 of Fig. 1 is replaced in Fig. 3 by a condenser 127 and a resistance 128 connected in series. The condenser 127 may have a capacity of .05 microfarads and the resistance of resistance 128 may be a half megohm. Except as above noted, the detector circuit and associated signal circuit of Fig. 3 are exactly like those of Fig. 1, except that the variable resistance or rheostat 111 in the cathode circuit of the valve 107 of Fig. 1 is omitted in Fig. 3.

There is no essential difference between the general operation of the apparatus shown in Fig. 1 and the same apparatus when modified, as shown in Fig. 3, only by the substitution of the input and output circuit coupling connections and detector circuit of the latter figure. The coupling of the detector circuit of Fig. 1 is simpler, however, than that shown in Fig. 3, and some of the impedance elements shown in Fig. 3 are appreciably more costly to produce than the elements used in lieu of them in Fig. 1.

It is to be noted that the precise impedance and voltage values hereinbefore stated are not critical, and all of them are subject to modification as conditions make desirable. The values stated, however, are values which have been tested and found suitable for the purposes hereinbefore stated.

Heretofore, potentiometric measuring and control apparatus of the general type illustrated herein has included safety provisions, different from those disclosed herein, for preventing improper operation of the apparatus as a result of some apparatus failure or failures. I believe, however, that I am the first to use the amplifier of such apparatus in creating a high frequency oscillation current used in providing protection against injurious operation resulting from apparatus failure. I also believe that no prior embodiment of potentiometric measuring and control apparatus of the type illustrated has included means providing protection against the injurious results of as many different forms of apparatus failure as does the embodiment of my invention disclosed herein. I know of no prior arrangement including a measuring circuit network and a rebalancing motor in which a motor defect preventing normal motor operation will actuate an alarm signal device. I believe I am the first, also, to provide measuring and control apparatus of the general type disclosed, with protective means automatically actuated by an incipient thermocouple failure, when that failure is one which has not made the thermocouple circuit non-conductive, but has materially increased the thermocouple resistance.

The means which I have devised for utilizing the amplifier of measuring and control apparatus of the general type disclosed herein, in creating a high frequency oscillating current, may be employed in arrangements serving purposes other than the safety purposes described herein, and in my copending application, Serial No. 678,256, filed June 21, 1946, I have illustrated arrangements in which such a high frequency oscillation current is utilized to produce a control effect when balance is attained, or closely approached, at the end of a rebalancing operation. The control effect thus produced may subject the rebalancing motor to a damping action or it may actuate a recording mechanism. In said copending application, I generically claim certain inventive features disclosed in common in that application and in the instant application.

Figure 4:
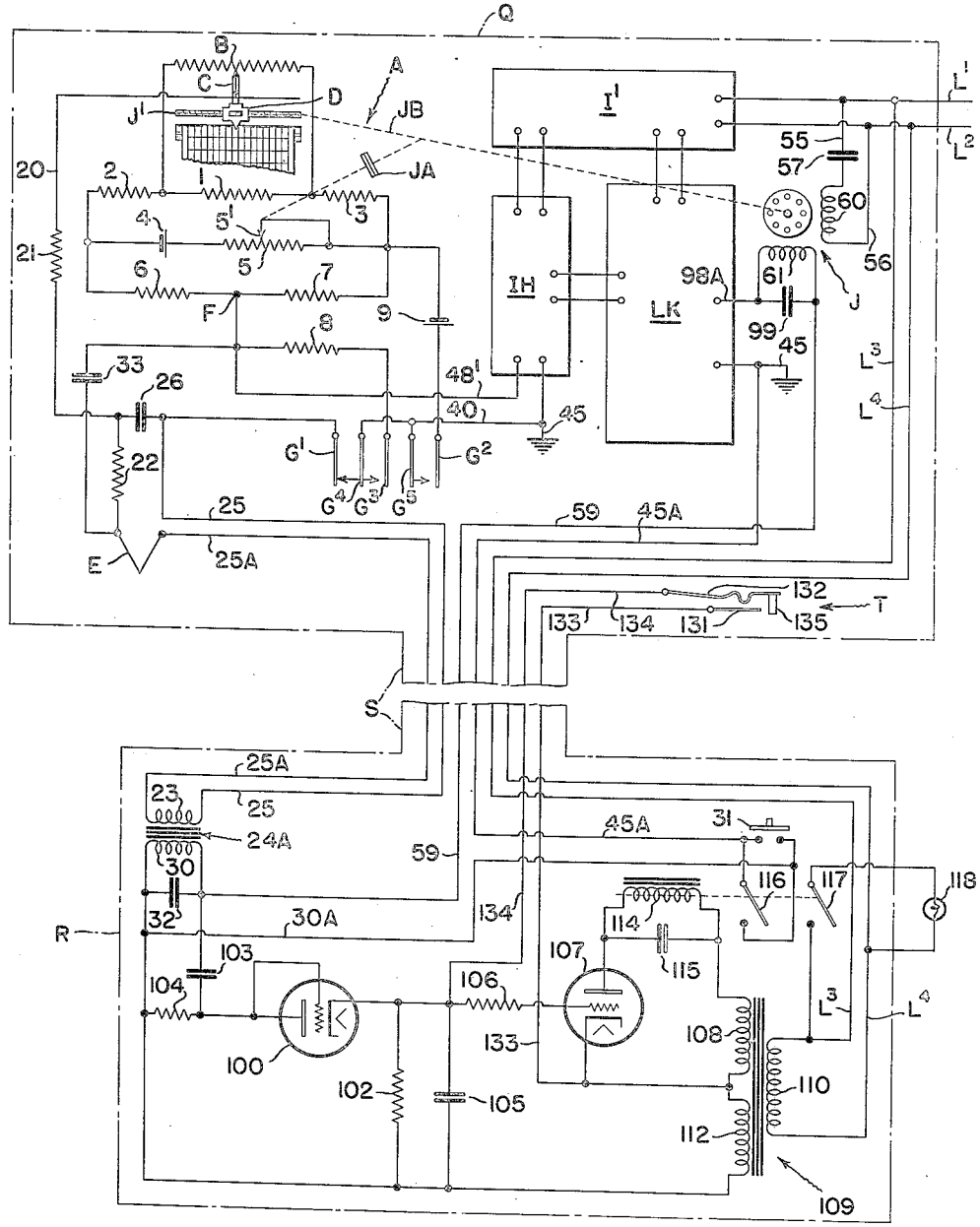
Fig. 4 is a diagrammatic representation of a potentiometric self-balancing measuring instrument and an associated protective mechanism unit mounted in a casing separate from the instrument casing and operatively connected to the instrument by a cable.

Figs. 4, 4a and 5 illustrate an embodiment of the present invention in which the apparatus elements shown in Fig. 1 are combined to form a measuring instrument Q, and a separate protective apparatus unit R. The instrument Q and unit R are each mounted in an individual casing, and each operatively connected to the other by conductors assembled in a cable S. Advantageously and as shown, the cable S includes conductors through which a switch T included in the instrument unit Q may be operated to prevent the protective mechanism unit from operatively responding to failures of elements of the instrument unit to which the protective mechanism unit is normally responsive.

As diagrammatically shown in Fig. 4, the instrument unit Q includes without significant change therein, all of the apparatus elements shown in Fig. 1 except the coupling transformer 24, the alarm or control device 118, and the detector circuit elements through which the device 118 is normally actuated on the failure of apparatus elements shown in Fig. 1 and included in the instrument Q of Fig. 4. To simplify the drawing, the conversion element of the instrument Q, including a vibrator and transformer like the parts I and H, are represented in Fig. 4 by the diagram block IH and the amplifier and motor drive system, including the electronic tubes L, M and K of Fig. 1, is represented in Fig. 4 by the diagram block LK. As is hereinafter made apparent, the condenser 39 of Fig. 1 is not needed in, and is omitted from Fig. 4.

In Fig. 4, the control winding 61 of the motor J and the condenser 99 in parallel therewith are shown as connected between the output terminal 98A of the system LK and the conductor 59, and the grounded output conductor of the system LK is designated 45A in Fig. 4. The standardizing switch, including contacts G, G', $G^2$ and $G^3$ of Fig. 1, is shown in Fig. 4 in a conventional form in which the single movable contact G of Fig. 1 is replaced by two contacts $G^4$ and $G^5$, mechanically coupled for simultaneous adjustments to collectively do what is done by adjustment of the single contact G of Fig. 1.

The calibrating adjustments of the resistance 5 may be made manually in Fig. 4 and in Fig. 1, and no means are shown in Fig. 1 for making such adjustments automatically, though they might well be made by the rebalancing motor J in accordance with a customary practice in the art, which the apparatus shown in Fig. 4 is adapted to follow. Thus a manually actuated clutch or analogous device JA is provided for operatively connecting the slider contact 5' to the mechanical adjusting element JB through which the rotation of the motor J effects rebalancing adjustments of the slider contact C of the measuring circuit A in the normal operation of the measuring apparatus. To initiate a calibrating operation of the instrument Q of Fig. 4, the device JA is actuated to connect the contact 5' to the actuating element JB, and the calibrating switch is actuated to connect the contacts $G^4$ and $G^5$ to the contacts $G^3$ and $G^2$, respectively. Thereupon the motor J is rotated through the amplifying and motor drive system LK in response to any difference between the E. M. F. of the standard cell 9 and the opposing potential drop in the resistor 7. By such rotation, the motor J adjusts the contact 5' along the resistance 5 as required to make said potential drop equal to the standard cell E. M. F. At the conclusion of the calibrating or standardizing operation, the device JA is actuated to disconnect the contact 5' from the actuator JB, and the calibrating switch is returned to its normal condition. During the standardizing operation, the slider contact C may be, but usually is not disconnected from the motor J. Adjustments of the contact C occurring when the standardizing switch is adjusted to effect standardization by separating the contacts G' and $G^4$, to disconnect the thermocouple E from the bridge point F, have no operative effect except to leave the contact C in a different position along the slide wire B at the end of the calibrating operation from that occupied at the beginning of said operation.

The protective unit R of Fig. 4 includes a transformer 24A which may be identical with the transformer 24 of Fig. 1, but as shown, has a fixed magnetic core instead of the adjustable core 29 of Fig. 1. The secondary winding 23 of the transformer 24A has one terminal connected by a conductor 25A to one terminal of the thermocouple E of the instrument unit Q, and has its other terminal connected through the conductor 25 to the contact G' of the calibrating switch of the instrument unit. Each of the conductors 25 and 25A comprises a section within the casing of the unit Q, a section within the casing of the unit R, and an intermediate section forming a part of the cable S. Each of the other conductors hereinafter mentioned as connecting an element of the unit R to an element of the instrument Q, includes a section in the cable S, an end section within the casing of the instrument Q and another end section within the casing of the unit R.

One terminal of the primary winding 30 of the transformer 24A and the corresponding terminal of the associated condenser 32 are connected by the conductor 59 to the motor control winding 61 and condenser 99. The second terminals of the winding 30 and condenser 32 are connected to the grounded output terminal 45A of the amplifying and motor drive system LK by means including the manually actuated switch 31 and relay switch 116, which in Fig. 4 form part of the protective mechanism unit R. To this end, the output conductor 45A includes an intermediate section in the cable S and a section which is connected to one contact of the switch 31 and one contact of the switch 116. The second contacts of the switch 31 and switch 116 are connected by a conductor 30A to the second terminals of the transformer primary winding 30 and condenser 32. The primary winding 110 of the relay transformer 109 of the unit R has its terminals connected by branch conductors L³ and L⁴, forming parts of the cable S, to portions of the low frequency alternating current supply conductors L' and L² which extend into the casing of the instrument unit Q.

As will be apparent, the apparatus shown in Fig. 4, in so far as it has been described in detail, is adapted to insure safe failures in measuring operations in the same way and by the same or equivalent means as safe failures are insured with the apparatus shown in Fig. 1. Furthermore, the safe failure action is obtained by the use of a relatively simple self-contained unit R connected to the measuring instrument unit Q, which it protects, only by means of a simple cable S. The unit R may thus be connected to a previously installed measuring instrument of the general character of the instrument Q, and a great many such instruments are now in use without any of the safe failure features which can be provided by connecting a unit R to each such instrument. The addition of a unit R to such a previously installed instrument is a relatively simple and inexpensive operation. Moreover, a protective mechanism unit R which has been connected to a measuring instrument can be readily disconnected therefrom for repairs, or for other reason which may develop, and the measuring instrument quickly put back into condition for operation without the safe failure insurance provided when the protective unit is attached to the instrument.

It is practically desirable under certain conditions to temporarily make inoperative the protective mechanism provided herein to insure safe failure of the measuring apparatus. In particular, it is ordinarily advantageous to make the protective apparatus inoperative during each calibration operation and for a short period thereafter. It is necessary to maintain the apparatus R inoperative to perform its protective functions during the standardizing operations of the instrument Q inasmuch as movement of the standardizing switch into its standardizing position causes the thermocouple circuit to be opened, and hence causes the high frequency oscillating signal to disappear, which would normally cause the apparatus R to effect safe failure of the system. Also, during each standardizing operation, as previously mentioned, the contact C may be displaced along the slide wire B from the position which it occupied at the beginning of such an operation. Although such displacement does not affect the operation of the measuring system, other than to temporarily unbalance it, upon the completion of the standardizing operation when the measuring circuit and the thermocouple are again connected to the system LK, a large signal due to this unbalance may be applied to the input of the element IH. Such a signal will prevent the appearance of the high frequency oscillations in the system until the latter has been rebalanced and the contact C has been returned to a balance point along the slide wire B. Accordingly, it is necessary to maintain the apparatus R inoperative for a period after each standardizing operation to allow the motor J sufficient time to effect any necessary rebalancing of the system so that an undesirable safe failure of the apparatus will not occur.

The apparatus R shown in Fig. 4 may be made temporarily inoperative by the closure of a switch T. The closure of the switch T prevents the actuation of the alarm or control device 118 when the high frequency signal disappears from the output circuit of the amplifying and motor drive system LK.

In the form shown by way of example in Figs. 4 and 4a, the switch T comprises a stationary contact 131 and a movable contact 132. The stationary contact 131 is connected by a conductor 133 to the cathode of the valve 107. The contact 132 is connected by a conductor 134 to the control grid of the valve 107 through the resistance 106. The effect of closing the switch T is thus to maintain the control grid of the valve 107 at a potential relative to the potential of the cathode of that valve as required to maintain the conductivity of the valve 107 regardless of the condition of operation of the valve 100. While the switch T is thus closed, the relay winding 114 cannot be deenergized by disappearance of the high frequency signal from the output circuit of the system LK.

In some cases, provisions may advantageously be made for automatically effecting the closure and opening of the switch T at the beginning and end of each standardizing operation. Thus as shown in Fig. 4a, the switch T may be biased to its closed position, and normally held in its open position by some element or device Q' which must be moved to initiate a calibration operation. In particular, the element Q' may be a normally closed door of the housing of the instrument Q which must be opened to give access to the standardizing switch when the latter is to be adjusted into its standardizing position. To this end, the contact 132 may be a spring contact as shown in Fig. 4, which is biased by its own resiliency for movement into engagement with the contact 131, and which is held out of engagement with the contact 131 by the engagement of the door Q', when closed, with a projection 135 carried by the contact 132. Thus, the switch T is maintained in its open position when the door Q' is in its closed position, and when the door Q' is moved out of its closed position it permits the switch to close, and thereafter opens the switch when the door is returned to its closed position.

The closing of the door Q' must be delayed following the return of the standardizing switch into its measuring position to allow the system time to effect any rebalancing made necessary during the standardizing operation. Such a delay in closing the door Q' maintains the switch T in its closed position until the high frequency signal reappears in the system, and hence prevents the apparatus R from effecting an undesirable safe failure of the system. In general, the door Q' should be kept open until the motor J stops running, to insure the prevention of an unnecessary shut-down of the equipment.

Since the condenser 39 is provided in Fig. 1 for the purpose of maintaining the protective mechanism operative for safe failure purposes during calibration periods, it is unnecessary and may be omitted from Fig. 4 where said mechanism is intentionally made inoperative to respond to the disappearance of the high frequency signal during calibration periods.

In lieu of the separate short-circuiting switch T shown in Figs. 4 and 4a, use may be made of a special standardizing switch GA adapted to serve the purposes of the standardizing switch and of the switch T of Fig. 4. The switch GA, shown in Fig. 5, includes stationary contacts $G'$, $G^2$, and $G^3$ and movable contacts $G^4$ and $G^5$ which are like the correspondingly designated contacts of the standardizing switch shown in Fig. 4. The switch GA also includes an additional stationary contact $G^6$ and an additional movable contact $G^7$. The contacts $G^6$ and $G^7$ are separated in the normal operating condition of switch GA, shown in Fig. 5, but the contact $G^7$ is moved into engagement with the contact $G^6$ when the contacts $G^4$ and $G^5$ are moved into engagement with the stationary contacts $G^3$ and $G^2$, respectively, to initiate a standardizing operation. The contacts $G^6$ and $G^7$ of Fig. 5 serve, in effect, to replace the contacts 131 and 132 of Figs. 4 and 4a, and are connected to the conductors 133 and 134, respectively.

Since in the operation of the switch GA no means are provided for maintaining the contacts $G^6$ and $G^7$ in engagement for the necessary period after the completion of standardizing, some form of time delay must be introduced into the system, when the switch GA is employed, which will be analogous to that provided when the door Q' is held open at the end of each standardizing operation until rebalancing is completed. Apparatus exhibiting such a time delay and hence suitable for use with the switch GA is shown in Fig. 6, which will now be described.

The arrangement of Fig. 6 includes a detector circuit which may be identical with that shown in Fig. 4, except that in Fig. 6 the control grid of the valve 107 is directly connected to the conductor 30A and thereby to ground by means of a resistor 136 and a condenser 137 in parallel therewith. In Fig. 6 also, the short-circuiting conductor 134 of Fig. 4 is replaced by a conductor 134' which is connected through a resistor 138 to the anode of the valve 100. Thus, with the arrangement shown in Fig. 6, the closure of the switch T connects the secondary winding 112 of the transformer 109 in the anode circuit of the valve 100 and thus maintains the conductivity of the valve 100 regardless of the disappearance of the high frequency signal current from the output circuit of the system LK. With the switch contacts $G^6$ and $G^7$ of Fig. 6 closed, the valve 100 passes a pulse of current through its anode circuit once during each cycle of alternation of the voltage supplied by the conductors L' and L², and such current flow through the valve 100 maintains the normal operation of the valve 107 and the energization of the relay winding 114.

The closure of the contacts $G^6$ and $G^7$ of Fig. 6 operates to prevent the actuation of the device 118 during standardization, just as does the closure of the switch T of Fig. 4. Furthermore, by properly proportioning the resistance values of the resistors 102, 106, and 136 and the capacitive values of condensers 105 and 137, the time at which the apparatus R becomes operative after the opening of the contacts $G^6$ and $G^7$ can be suitably delayed. Thus, for example, if at the end of a standardizing operation the measuring circuit is too far unbalanced to permit the appearance of the high frequency signal until the unbalance has been substantially reduced, actuation of the alarm 118, or other control effect, is temporarily avoided by the delay action of the detector circuit. The delay action provided should be sufficient to permit movement of the slider contact from one end to the other of its range of movement, following the opening of the contacts $G^6$ and $G^7$. Also during normal operation with the contacts $G^6$ and $G^7$ open, the disappearance of the high frequency signal from the output circuit will not effect the deenergization of the valve 107 and the opening of the switch 116 and the closing of the switch 117 for a similar delay period. This feature is of advantage where quantities differing widely in value are successively applied to the measuring circuit input of a multiple point potentiometer embodying the apparatus illustrated in Fig. 6. For the timing effects of the apparatus shown in Fig. 6, the significant resistance and capacity values should be properly related, as follows, for example:

The resistance of resistor 102 may be 2 megohms.
The resistance of resistor 106 may be 1 megohm.
The resistance of resistor 136 may be 1 megohm.
The capacity of the condenser 105 may be 1 mfd.
The capacity of the condenser 137 may be 1 mfd.

If desired, the door-operated switch T of Figs. 4 and 4A can be used with the arrangement of Fig. 6 in place of the contacts $G^6$ and $G^7$ of the standardizing switch. When the switch T is so employed in connection with a detector having the time delay feature of the Fig. 6 arrangement, the door Q', controlling the actuation of the switch T, need not be held open at the end of each standardizing operation until rebalancing is completed, but can be shut the instant that standardizing is completed.

It is practically important to avoid significant capacitive coupling between the terminals of the primary winding 30 and the terminals of the secondary winding 23 of the transformer 24A of Figs. 4 and 6. To this end the high potential terminal conductor 59 should be widely separated from the conductors 25 and 25A in the cable S, as is shown in Fig. 7.

Figure 8:
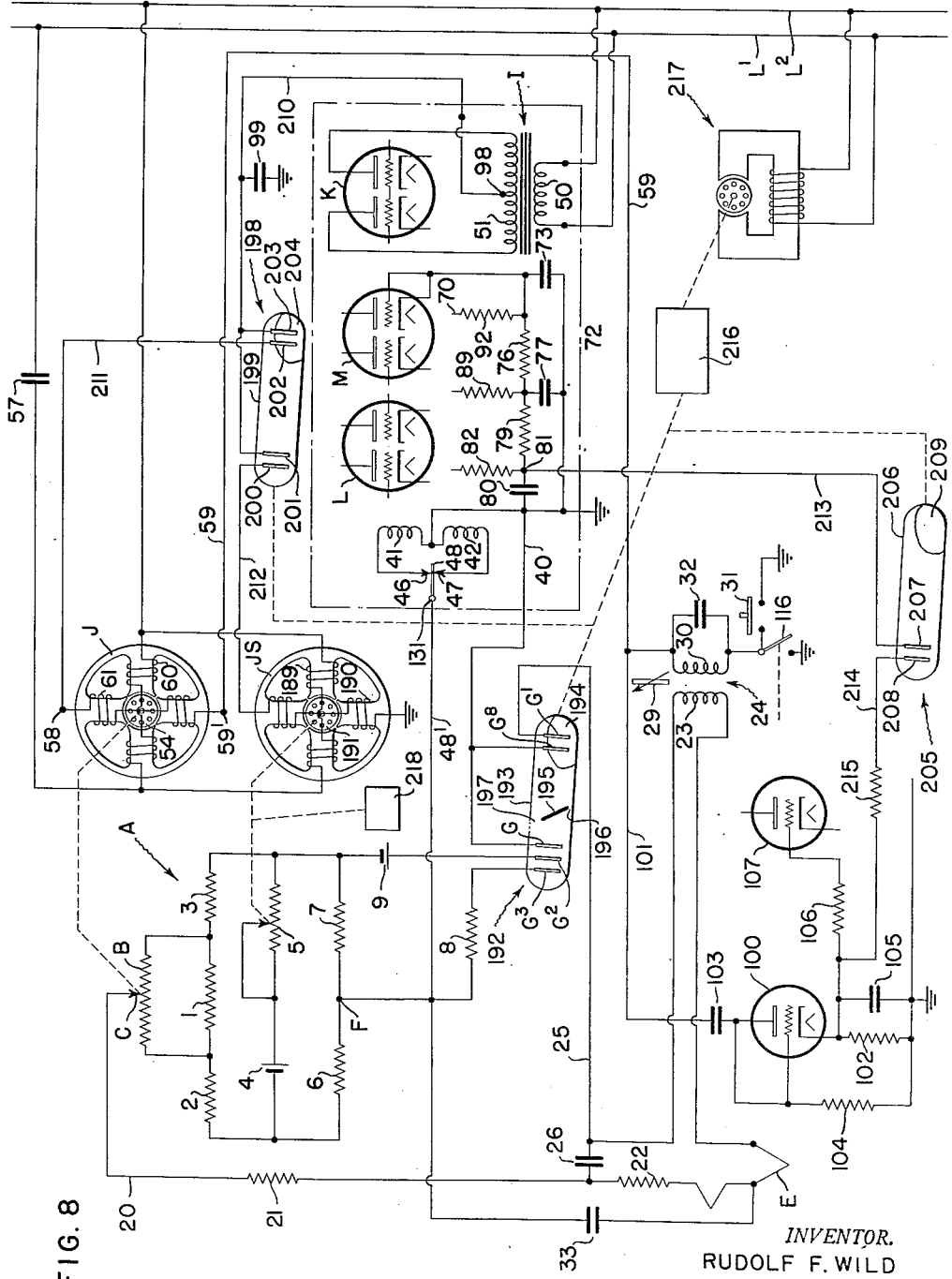
Fig. 8 is a diagram illustrating the adaptation of the present invention to a system employing a different standardizing circuit from those of the systems shown in Figs. 1 and 4.

Fig. 8 illustrates, more or less diagrammatically, a modification of the arrangement of Fig. 1 which differs from the latter in respect to its automatic provisions for accomplishing the standardizing or recalibrating adjustments effected manually in Fig. 1. In the system of Fig. 8, standardizing is performed by a reversible electric motor JS, which may well be, and is shown as being, identical to the rebalancing and recording motor J. The motor JS is operatively connected by a suitable linkage to the slider contact of the adjustable battery resistance 5 of the bridge circuit A. Rotation of the motor JS in one direction or the other produces an increase or a decrease, respectively, in the voltage applied to the bridge circuit A by the battery 4. The motor JS comprises a power winding 189, a control winding 190, and a rotor 191, the latter being mechanically coupled to the variable resistance 5 as previously explained.

In Fig. 8, the standardizing switch contact members G, G', $G^2$, and $G^3$ are contained in a mercury switch 192. The latter comprises a suitable envelope 193 in one end of which are located the contact members G, $G^2$ and $G^3$. The contact member G', and a contact member $G^8$ are located in the opposite end of switch 192, and a suitable quantity of mercury 194 is contained in the envelope 193. A partial, inclined barrier 195 is located within the envelope 193, adjacent to the end of the latter in which are located the contact members G, G² and G³. The barrier 195 is provided with an orifice 196 and an upper opening 197. The mercury switch 192 is so constructed, for a purpose to be hereinafter described, that tilting of the envelope 193 from a position in which the mercury 194 forms a contact between the contact members G' and G⁸ to a position in which the left-hand end of the envelope 193 is lower than the right-hand end in Fig. 8, will cause the mercury to flow from right to left over the top of the barrier 195, thus instantly breaking the contact between the contact members G' and G⁸, and making contact between the contact members G, G² and G³. When the envelope 193 is subsequently tilted in the opposite direction making the right-hand end lower than the left-hand end, the flow of mercury from left to right will be delayed by the barrier 195, which will act to trap the mercury in the left-hand end of the envelope. However, the mercury will flow through the orifice 196, and eventually the contact between the contact members G, G², and G³ will be broken, and contact will be made between the contact members G' and G⁸. The time delay which occurs between the last mentioned tilting of the envelope 193 and the subsequent breaking and making of contacts, just described, is dependent upon the size of the orifice 196 and upon other mechanical construction features of the mercury switch 192.

A second mercury switch 198 is included in the apparatus of Fig. 8 for the purpose of disconnecting the rebalancing motor J from the system during standardizing and for connecting the standardizing motor JS in place of the motor J during that time. To this end, the mercury switch 198 comprises an envelope 199 in one end of which is located a pair of contact members 200 and 201, respectively. A second pair of contact members 202 and 203, respectively, is located in the opposite end of the envelope 199, and the latter also includes a suitable quantity of mercury 204. Tilting the envelope 199 so that the left-hand end is lower than the right-hand end causes the contact between the contact members 202 and 203 to be broken and contact between the contact members 200 and 201 to be made. Conversely, tilting the envelope 199 in the opposite direction causes the contact between the contact members 200 and 201 to be broken and contact to be made between the contact members 202 and 203.

A third mercury switch 205 is included in the apparatus of Fig. 8 to prevent the alarm system from operating to indicate system failure during the standardizing periods, in which periods the high frequency signal is interrupted due to the disconnecting of the motor J from the system. The mercury switch 205 comprises an envelope 206 in one end of which is located a pair of contact members 207 and 208. The envelope 206 also contains a quantity of mercury 209.

In Fig. 8, the amplifier and motor drive circuit of Fig. 1 is only partially shown, in order to avoid unnecessary complication of the figure. As shown, the center tap 98 of the secondary winding 51 of the power transformer I' is connected by a conductor 210 to the contact members 201 and 203 of the mercury switch 198. The contact member 202 of the latter is connected by a conductor 211 to the terminal 58 of the control winding 61 of the motor J. The contact member 200 of the mercury switch 198 is connected by a conductor 212 to one end of the control winding 190 of the motor JS. The other end of the winding 190 is connected to ground. The motor condenser 99 is connected between the conductor 210 and ground, in parallel with whichever one of the control windings 61 and 190 is connected to the conductor 210.

The power winding 189 of the motor JS is connected in parallel with the power winding 60 of the motor J. To maintain a series resonant circuit, the motor condenser 57 of Fig. 8 must have twice the capacity of the condenser 57 of Fig. 1.

The contact member 207 of the mercury switch 205 is connected by a conductor 213 to the positive filter circuit output terminal 81 of the electronic amplifier. The contact member 208 of the switch 205 is connected by a conductor 214 and through a resistance 215 and the previously mentioned resistance 106 to the control grid of the triode valve 107 of the detector circuit. All components and connections of the circuit of Fig. 8, not specifically mentioned above, are identical with the corresponding components and connections of Fig. 1, although some of these components and connections are not shown in Fig. 8 in order not to unnecessarily complicate the drawing.

At periodically recurring intervals, the mercury switches 192, 198, and 205 are tilted from their normal positions, in which their right-hand ends are lower than their respective left-hand ends, to their standardizing positions, in which their left-hand ends are lower than their respective right-hand ends. At the completion of each standardizing period, these switches are then returned to their normal positions. The switches 192, 198, and 205 are given these tilting movements into and out of their standardizing positions by suitable means indicated at 216 in Fig. 8. The means 216 for periodically tilting the switches 192, 198 and 205 is shown as being driven by a motor 217, which may be the motor employed to drive a moving record sheet or chart when the apparatus of Fig. 8 is of the recording type. The motor 217 may well be of the shaded-pole, synchronous type, and is shown as such in Fig. 8, wherein it is seen to be supplied with energizing voltage from the supply conductors L' and L². As shown, the resistance 5 may be supplied with an indicating device 218 which will indicate the condition of the battery 4.

In the normal operating condition, the system of Fig. 8 functions in a manner identical to that described for the system of Fig. 1. When standardizing occurs, however, the operation of the apparatus of Fig. 8 is as follows: The mercury switch 205 is tilted downward to the left into its standardizing position by the action of the device 216, driven by the motor 217. This completes the circuit between the positive terminal 81 of the amplifier and the control grid of the valve 107 of the detector, which circuit can be traced from the terminal 81, through the conductor 213 to the contact member 207, through the mercury in the switch 205 to the contact member 208, and through the conductor 214 and the resistances 215 and 106 to the control grid of the valve 107. This circuit causes a positive voltage to be placed on the control grid of the valve 107, but since the latter is normally conductive when the system is operating satisfactorily, this application of a positive control grid voltage produces no effect on the detector circuit. Following the tilting of the switch 205, the switch 198 is tilted downward to the left into its standardizing position. This causes the circuit to the control winding 61 of the rebalancing motor J to be opened, and the circuit to the control winding 190 of the standardizing motor JS to be completed. This latter circuit can be traced from the center-tap 98 of the secondary winding 51 of the power transformer I' through the conductor 210 to the contact member 201, through the mercury in the switch 198 to the contact member 200, and through the conductor 212 and control winding 190 of the motor JS to ground. The opening of the control winding circuit of the motor J causes the high frequency oscillating signal to disappear, but the positive voltage applied to the control grid of the valve 107 by the previously described circuit prevents the apparatus from indicating system failure and prevents the shut-down of the system which would normally occur upon the disappearance of the high frequency signal.

Following the tilting of the switch 198, the switch 192 is tilted downward to the left into its standardizing position, thus removing the thermocouple E from the system and connecting in the standard cell 9, as explained hereinbefore in connection with the apparatus of Fig. 1. If standardization is necessary, a signal will be transmitted to the motor JS, which will, in turn, drive the slider on the resistance 5 to such a position as to effect standardization of the system.

At the end of the standardizing period, the length of which is determined by the design of the device 216 and the speed of the motor 217, the switch 192 will be tilted downward to the right into its normal position, but the mercury will temporarily remain in contact with the contact members G, $G^2$ and $G^3$, due to the barrier 195. After the tilting of the switch 192, the switch 198 will be tilted downward to the right into its normal position, thus breaking the control winding circuit of the motor JS and completing the control winding circuit of the motor J. This latter circuit can be traced from the center-tap 98 of the transformer winding 51 through the conductor 210 to the contact member 203, through the mercury in the switch 198 to the contact member 202, and through the conductor 211, the control winding 61, the conductor 59, the transformer winding 30, and the switch 116 to ground. Following the tilting of the switch 198, sufficient mercury in the switch 192 will have passed through the orifice 196 to break the contact between the contact members G, $G^2$ and $G^3$ and to make contact between the members G' and $G^8$, thereby removing the standard cell from the system, and replacing the thermocouple. Finally, the switch 205 is tilted downward to the right into its normal position, thereby removing the positive potential from the control grid of the valve 107. Since the return of the switch 198 to its normal position has already completed the control winding circuit of the motor J and thereby reestablished the high frequency signal, however, the removal of the positive control grid signal produces no effect on the system.

In Fig. 9 there is illustrated, more or less diagrammatically, one form which the device 216 of Fig. 8 may take. In Fig. 9, the mercury switches 192, 198 and 205 are shown mounted on a supporting member 219, which is rotatable through a small angle about a point 220. The member 219 is biased in a clockwise direction by a spring 221, and is given periodic counterclockwise standardizing movements by a lever 222 driven by a follower 223, which is in engagement with the periphery 224 of a cam 225. The cam 225 is driven through suitable means, such as gears 226 and 227, by the motor 217 of Fig. 8, not shown in Fig. 9.

When the follower 223 is in engagement with the portion 224 of the cam 225, the switches 192, 198 and 205 are maintained in their normal positions by the action of the spring 221. The cam 225, has, however, a raised peripherial portion 228 which, when engaged by the follower 223 once each revolution, causes counter-clockwise rotation of the member 219, thereby tilting the switches 192, 198 and 205 into their standardizing positions. The latter are so mounted on the member 219 that the switch 205 will be tilted into its standardizing position first, followed first by the switch 198, and then by the switch 192, as explained hereinbefore. This allows the alarm prevention voltage to be applied to the valve 107 by the switch 205 prior to the opening of the control winding circuit of the motor J by the switch 198, and allows the motor J to be removed from the system by the switch 198 before the standardizing circuit is completed by the switch 192.

The size and shape of the portion 228 of the cam 225 are so chosen as to give the required motion to the member 219, and also to maintain the member 219 in its standardizing position for a sufficient length of time to permit complete standardizing to take place under all conditions. At the end of the standardizing period, the follower 223 returns to the cam portion 224, and the switches 192, 198 and 205 are returned to their normal positions by the clockwise rotation of the member 219 under the action of the spring 221. The switch 192 is tilted first, but due to the time delay action of the barrier 195, the contact between the left-hand end contact members is momentarily maintained. The switch 198 is tilted next, and thereby removes the motor JS from the system and replaces the motor J. By this time, the mercury in the switch 192 has passed through the barrier orifice 196, and the system is thereby returned from the standardizing position into the normal position. Finally, the switch 205 is returned to its normal position, thereby removing the alarm-prevention voltage from the control grid of the valve 107 subsequent to the return of the system to the normal condition by the switch 192, which return follows the replacement of the standardizing motor JS by the rebalancing motor J in the amplifier and motor drive circuit output.

The device 216 for operating the standardizing switches of the circuit of Fig. 8 may take other forms than that illustrated in Fig. 9. For example, two other forms of the device 216 are illustrated in Figs. 10 and 11 respectively. The devices illustrated in Figs. 10 and 11 both include suitable means for preventing the standardizing motor JS from being driven as a result of a change in the quantity being measured, and for preventing the rebalancing motor J from being driven as a result of a need for system standardization, during the time in which switching is taking place. The last mentioned devices also include means for preventing actuation of the alarm device during standardizing.

In Fig. 10, the illustrated device is identical to that of Fig. 9, except in regard to the mercury switches 192 and 198 of Fig. 9. The latter switches are replaced in Fig. 10 by mercury switches 192' and 198', respectively, having functions identical to those of the corresponding switches 192 and 198 of Fig. 9. The switch 198' differs from the switch 198 in that the former is provided with a slightly curved envelope while the latter has the conventional straight envelope. The switch 192' differs from the switch 192 in that the former does not contain a barrier as does the switch 192.

In operation, rotation of the member 219 of Fig. 10 in a counter-clockwise direction first, causes the application of the alarm-prevention voltage to the valve 107 through the switch 205. Next, the rebalancing motor J is disconnected from the circuit by the switch 198', but the latter does not immediately connect the standardizing motor JS into the circuit since the mercury located in the switch 198' momentarily rests in the mid-portion of the curved envelope of the switch and hence does not contact any of the switch contact members. Further rotation of the member 219 next causes the mercury switch 192' to instantly switch the measuring circuit from its normal condition to its standardizing condition, and finally, the switch 198' becomes tilted a sufficient amount to cause it to connect the motor JS into the circuit.

At the completion of the standardizing period, the member 219 is rotated in a clockwise direction, and the operating sequence of the mercury switches 192', 198', and 205 is opposite to that just described. More specifically, the motor JS is first removed from the circuit by the action of the switch 198'. Next, the switch 192' switches the measuring circuit from its standardizing condition to its normal running condition, the switch 198' connects the motor J into the circuit, and finally the alarm-prevention voltage is removed from the detector circuit by the opening of the switch 205.

In the operation of the device of Fig. 10, neither of the motors J or JS is connected in the circuit while the measuring circuit is being switched from its normal condition to its standardizing condition, or vice-versa. Consequently, any tendency for the rebalancing motor J to be driven in response to a standardizing signal is eliminated, as is any tendency for the standardizing motor JS to be driven in response to a change in the quantity being measured. Further, at all times in the standardizing cycle when the motor J is not connected in the circuit, the alarm-prevention voltage is applied to the detector circuit to prevent operation of the alarm device as a result of an open motor circuit.

The device illustrated in Fig. 11 for operating the standardizing switches differs from those devices previously disclosed in that the former comprises a conventional microswitch 205' in place of the mercury switch 205 of Figs. 8, 9 and 10. Also, the switches of Fig. 11 are actuated by a mechanism including a Geneva movement 229, which mechanism replaces the cam and follower mechanism of Figs. 9 and 10. In Fig. 11, the mercury switches 192' and 198 are mounted on a member 230 which is pivoted to turn about a fixed point 231. The member 230 is biased in a counter-clockwise direction by a spring 232, which spring normally holds the member 230 against a stop 233. Fastened to the member 230 is a lever 234, through which the member 230 is given periodic clockwise rotations when the lever is engaged by a cam 235. The latter is fastened to, and driven by, a wheel 236 which rotates about a fixed point 237 and forms a part of the Geneva movement 229. The wheel 236 is given periodic movements in a counterclockwise direction by a member 238 carrying a driving pin 239, the wheel 236 and member 238 forming the Geneva movement 229. The member 238 is continuously rotated through a suitable gear 240 by the driving gear 227, the latter being driven by the motor 217 of Fig. 8, not shown in Fig. 11. The manner in which the Geneva movement operates to impart to the cam 235 an intermittent motion of rotation in a counter-clockwise direction is well known to those skilled in the art, and need not be described in detail here.

The cam 235 has a raised peripherial rear portion 241 which is adapted to engage the actuating plunger 242 of the switch 205' and thereby to operate the latter at suitable times. The switch 205' is of the normally open type, and functions, when closed, to apply the alarm-prevention voltage to the detector circuit, as does the switch 205 of Figs. 8, 9, and 10.

In the operation of the device of Fig. 11, one of the intermittent periods of rotation of the wheel 236 serves to effect standardization. At the start of this period, the cam portion 241 of the cam 235 engages the actuating plunger 242 of the switch 205' and thereby causes the latter to apply the alarm-prevention voltage to the detector circuit. As the cam 235 continues to rotate, it engages the lever 234 and thereby tilts the member 230 in a clockwise direction. As a result, the rebalancing motor J is disconnected from the circuit and the standardizing motor JS is connected into the circuit by the switch 198, just prior to the switching of the measuring circuit from the normal condition to the standardizing condition by the action of the switch 192'.

As the cam 235 continues to rotate, the standardizing period continues, until the cam 235 has rotated to a point where the lever 234 slips from engagement with the cam 235 and allows the spring 232 to give the member 230 a quick-return counter-clockwise rotation. This quick-return movement of the member 230 rapidly tilts the switches 192' and 198 back into their original, normal positions, with the result that these switches operate simultaneously to replace in the circuit the motor JS with the motor J, and to switch the measuring circuit from the standardizing to the normal condition. The final motion of the cam 235 causes the switch 205' to open, which removes the alarm-prevention voltage from the detector circuit. A complete rotation of the wheel 236, comprising a series of periodic partial rotations, is then necessary before standardizing will take place again. Since the switches 192' and 198 are quickly returned to their normal positions, their action is practically simultaneous, and there is no tendency for either of the motors J or JS to be driven as a result of an incorrectly interpreted signal.

Subject matter disclosed but not claimed herein is disclosed and is being claimed in the concurrently filed applications of Jack A. Caldwell, Serial No. 678,394, and Herbert A. Clarke, Serial No. 678,254. Other subject matter disclosed but not claimed herein is disclosed in my concurrently filed applications, Serial No. 678,256 and Serial No. 678,258.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The combination with electrical measuring and control apparatus comprising an electronic amplifier having an input circuit and an output circuit, measuring means connected to said input circuit and responsive to variations in the value of a variable quantity and adapted on a change in said quantity to impress an alternating current signal indicative of said change and of relatively low frequency on said input circuit, and a mechanism connected to said output circuit and actuated by and in selective accordance with the relatively low frequency signal impressed on said input circuit, of means coupling said input and output circuits to transfer energy from said output circuit to said input circuit and thereby impress a relatively high frequency signal on the relatively low frequency signal impressed on said input circuit, the magnitude of the relatively low frequency signal being proportioned to carry the relatively high frequency signal through said amplifier when said apparatus is in its normal operative condition and to attain a value high enough to cause the relatively high frequency signal to be clipped or cut off in said amplifier on the development of an apparatus defect preventing normal operation of said apparatus, and control means for producing a control effect when the relatively high frequency signal disappears from said output circuit.

2. A combination as specified in claim 1, in which the said control means is an electromagnetic relay deenergized on the disappearance of the relatively high frequency signal from said output circuit.

3. A combination as specified in claim 1, in which the means coupling said input and output circuits comprises a transformer having its secondary winding connected to said input circuit and having its primary winding connected in said output circuit in parallel with a condenser.

4. A combination as specified in claim 1, in which the means coupling said input and output circuits comprises a transformer having its primary and secondary windings respectively connected to said output and input circuits and having a magnetic core adjustable to vary the mutual inductance of said windings.

5. A combination as specified in claim 1, including a detector circuit which is responsive to the flow of the relatively high frequency signal and which includes a relay energized and deenergized accordingly as the relatively high frequency signal is or is not flowing, and means actuated by said relay to open the amplifier output circuit when said relay is deenergized.

6. A combination as specified in claim 1, including a detector circuit which is responsive to the flow of the relatively high frequency signal and which includes a relay energized and deenergized accordingly as the relatively high frequency signal is or is not flowing, and a signal device actuated by said relay.

7. A combination as specified in claim 1, including a starting switch for momentarily closing said output circuit and a relay switch energized in response to the flow of the relatively high frequency signal initiated when said output circuit is closed by said starting switch and maintaining the closure of said output circuit while energized, and being deenergized and opening said output circuit when the relatively high frequency signal is interrupted.

8. A combination as specified in claim 1, in which the amplifier output circuit includes a choke coil having one terminal connected to ground and in which said input and output circuit coupling means is connected to the output circuit at a point separated from ground by said choke coil.

9. A combination as specified in claim 1, in which the input and output circuit coupling means includes means adjustable to regulate the amount of energy transferred to the input circuit from said output circuit.

10. A combination as specified in claim 1, including a detector circuit responsive to the flow of the relatively high frequency signal through said amplifier, and in which said detector circuit includes an amplifier and means for adjusting its amplifying action to regulate the sharpness of response of the detector circuit to the relatively high frequency signal.

11. Self balancing potentiometric measuring and control apparatus of the type comprising a bridge circuit including a slide wire resistance, a slider contact adjustable along said resistance, means for connecting a source of variable unidirectional voltage between said contact and a point in said circuit at a potential differing from the potential of said contact by an amount which is equal and opposite to said voltage when said contact is in position to balance said bridge circuit, a reversible motor for adjusting said contact to rebalance said circuit when unbalanced by a variation in said voltage, an amplifier including an input circuit and an output circuit and electronic valve amplifying means connected between said input and output circuits, said motor having a control winding connected to said output circuit, amplifier energizing means for supplying alternating current of a relatively low frequency to said amplifier, and a converter connected to said source and impressing on said input circuit an alternating current signal which is of said relatively low frequency and is of a magnitude in predetermined proportion to the difference between said voltage and potential difference and is dependent in phase on whether said voltage exceeds or is smaller than said potential difference, and in combination with said apparatus, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition and to attain a value high enough to cause the relatively high frequency signal to be clipped or cut off in said amplifier on the development of an apparatus defect preventing normal operation, and high frequency signal detecting means for producing a control effect when the relatively high frequency signal disappears from said output circuit.

12. A combination as specified in claim 11, in which the said means for creating a control effect is an electromagnetic relay deenergized by the disappearance of the relatively high frequency signal, and adapted to permit or prevent energization of said motor accordingly as said relay is energized or deenergized.

13. A combination as specified in claim 11, in which said source of voltage is a thermocouple tending to abnormally increase in resistance when in a condition of incipient failure.

14. A combination as specified in claim 11, including means for standardizing said bridge circuit at intervals, comprising a standardizing switch adjustable between a normal operating position and a standardizing position and forming a connection between said source and contact for the flow of unidirectional current when said switch is in, but not when out of its normal operating position, and a condenser forming a connection between said source and contact for the flow of the relatively high frequency signal when said switch is out of its normal operating position.

15. A combination as specified in claim 11 including means for standardizing said bridge circuit at intervals, said last mentioned means comprising a second slide wire resistance and a second slider contact adjustable along said second resistance for varying the potential difference between said point in said circuit and said first mentioned contact, a second reversible motor adapted to adjust said second contact, said second reversible motor having a control winding adapted to be connected to said output circuit, and standardizing switch means adjustable between a normal operating position and a standardizing position and forming a connection between said source and said first mentioned contact for the flow of unidirectional current therebetween when said switch means is in, but not out of, its normal operating position, said switch means being operative when in its standardizing position to disconnect the control winding of said first mentioned reversible motor from said output circuit and to connect the control winding of said second reversible motor thereto and also being operative when in its standardizing position to exert a control effect on said high frequency signal detecting means to prevent said high frequency detecting means from producing its control effect.

16. A combination as specified in claim 11, wherein said detecting means includes alarm means and said control effect includes the actuation of said alarm means and the deenergization of said reversible motor, including means for standardizing said bridge circuit at intervals, said last mentioned means comprising a second slide wire resistance and a second slider contact adjustable along said second resistance for varying the potential difference between said point in said circuit and said first mentioned contact, a second reversible motor adapted to adjust said second contact, said second reversible motor having a control winding adapted to be connected to said output circuit, and standardizing switch means adjustable between a normal operating position and a standardizing position and forming a connection between said source and said first mentioned contact for the flow of unidirectional current therebetween when said switch means is in, but not out of, its normal operating position, said switch means being operative to disconnect the control winding of said first mentioned reversible motor from said output circuit and to connect the control winding of said second reversible motor thereto when in its standardizing position and also being operative when in its standardizing position to exert a control effect on said high frequency signal detecting means to prevent said high frequency detecting means from actuating said alarm means and from deenergizing said first mentioned reversible motor when said signal disappears from said output circuit.

17. A combination as specified in claim 11 including means for standardizing said bridge circuit at intervals, said last mentioned means comprising a second slide wire resistance and a second slider contact adjustable along said second resistance for varying the potential difference between said point in said circuit and said first mentioned contact, a second reversible motor adapted to adjust said second contact, said second reversible motor having a control winding adapted to be connected to said output circuit, and standardizing switch means adjustable between a normal operating position and a standardizing position and forming a connection between said source and said first mentioned contact for the flow of unidirectional current therebetween when said switch means is in, but not out of, its normal operating position and serving when in, but not when out of, its standardizing position to connect a source of standard voltage between points in said circuit in opposition to the voltage across said first mentioned resistance, said switch means being operative to disconnect the control winding of said first mentioned reversible motor from said output circuit and to connect the control winding of said second reversible motor thereto when in its standardizing position to exert thereto when in its standardizing position and also being operative when in its standardizing position to exert a control effect on said high frequency signal detecting means to prevent said high frequency detecting means from producing its control effect, said switch means comprising three switches actuated in a predetermined order, when said switch means is adjusted from its normal operating position into its standardizing position, to exert said control effect on said detecting means before disconnecting the control winding of said first mentioned reversible motor from said output circuit and connecting thereto the control winding of said second reversible motor, and to effect said last mentioned disconnecting and connecting operations before connecting said source of standard voltage between said points in said circuit, said three switches also being actuated in a predetermined order, when said switch means is adjusted from its standardizing position into its normal operating position, to disconnect the control winding of said second reversible motor from said output circuit and to connect thereto the control winding of said first mentioned reversible motor before forming said connection between said source and said first mentioned contact, and to form said last mentioned connection before ceasing to exert said control effect on said detecting means.

18. A combination as specified in claim 11, including a resistance connected in series with the source of unidirectional voltage in the path of flow for high frequency current through the bridge circuit between the said point therein and said slider contact and substantially reducing the tendency to wide variations in said flow due to variations in the resistance of said path of flow produced by rebalancing adjustment of said contact.

19. A combination as specified in claim 11, in which a damping resistance is connected in series with said source of voltage, and a condenser is connected in shunt with said source and said damping resistance in series therewith.

20. In combination, apparatus including an amplifier including an input circuit and an output circuit and electronic valve amplifying means connected between said input and output circuits, a reversible motor having a control winding connected to said output circuit, means adapted to impress on said input circuit a variable alternating current signal which is of relatively low frequency, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, high frequency signal detecting means for producing a control effect when the relatively high frequency signal disappears from said output circuit, and means operative under a predetermined condition to prevent said detecting means from producing said first mentioned control effect.

21. Self-balancing measuring and control apparatus of the type comprising a normally balanced circuit network, means unbalancing said network on a change in the value of a quantity measured, a reversible motor operable to rebalance said circuit when unbalanced, an electronic amplifier including an input circuit and an output circuit, said motor having a control winding connected to said output circuit, amplifier energizing means for supplying alternating current of a relatively low frequency to said amplifier, and means impressing on said input circuit an alternating current signal which is of said relatively low frequency and is of a magnitude in predetermined proportion to the extent of network unbalance and is dependent in phase on the direction of network unbalance, and in combination with said apparatus, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, and to attain a higher value and cause the relatively high frequency signal to be clipped or cut off in said amplifier on the development of an apparatus defect preventing normal operation, and high frequency signal detecting means for producing a control effect when the relatively high frequency signal disappears from said output circuit.

22. A combination as specified in claim 21, in which the apparatus defect preventing normal operation is a defect preventing the motor from responding normally to the relatively low frequency signal impressed on said control winding.

23. Self-balancing potentiometric measuring and control apparatus of the type comprising a bridge circuit including a slide wire resistance, a slider contact adjustable along said resistance, means for connecting a thermocouple between said contact and a point in said circuit at a potential differing from the potential of said contact by an amount which when said bridge circuit is balanced is equal and opposite to the thermocouple voltage, a reversible motor for adjusting said contact to rebalance said circuit when unbalanced by variation in the thermocouple voltage, an amplifier including an input circuit and an output circuit and electronic amplifying valves connected between said input and output circuits, said motor having a control winding connected to said output circuit, amplifier energizing means for supplying alternating current of a relatively low frequency to said amplifier, and a converter connected to said thermocouple and contact and impressing on said input circuit an alternating current signal of the same frequency as supplied to said amplifier by said energizing means and of a magnitude proportional to the difference between said voltage and potential difference and which is dependent in phase on whether said voltage exceeds or is less than said potential difference, and in combination with said apparatus, means responsive to the magnitude of the thermocouple resistance for producing a control effect on an increase in said resistance which is substantial but does not makes the thermocouple non-conductive.

24. A combination as specified in claim 23 in which the means producing a control effect on the increase in thermocouple resistance includes a switch mechanism which deenergizes said motor when said resistance is substantially increased.

25. The combination with electrical measuring and control apparatus comprising an electronic amplifier having an input circuit and an output circuit, measuring means connected to said input circuit and responsive to variations in the value of a variable quantity and adapted on a change in said quantity to impress an alternating current signal indicative of said change and of relatively low frequency on said input circuit, and a mechanism connected to said output circuit and actuated by and in selective accordance with the relatively low frequency signal impressed on said input circuit, of means coupling said input and output circuits to transfer energy from said output circuit to said input circuit, the frequency of the relatively high frequency signal being selected in the frequency range in which the gain of said amplifier is appreciably lower than it is for the frequency range including the relatively low frequency signal and the lower harmonics thereof, and thereby impress a relatively high frequency signal on the relatively low frequency signal impressed on said input circuit, the magnitude of the relatively low frequency signal being proportioned to carry the relatively high frequency signal through said amplifier when said apparatus is in its normal operative condition and to attain a value high enough to cause the relatively high frequency signal to be clipped or cut off in said amplifier on the development of an apparatus defect preventing normal operation of said apparatus, and control means for producing a control effect when the relatively high frequency signal disappears from said output circuit.

26. In combination, apparatus comprising an amplifier including an input circuit, an output circuit and electronic valve amplifying means connected between said input and output circuits, a reversible motor having a control winding connected to said output circuit, means adapted to impress on said input circuit a variable alternating current signal which is of relatively low frequency, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, high frequency signal detecting means normally responsive selectively to the appearance of the relatively high frequency signal in, and its disappearance from said output circuit, and means for temporarily rendering said detecting means unresponsive to said high frequency signal appearance and disappearance.

27. Apparatus as specified in claim 26, in which the means for rendering the signal detecting means unresponsive comprises a short-circuiting switch.

28. In combination, apparatus comprising an amplifier, an input circuit, an output circuit and electronic valve amplifying means connected between said input and output circuits, a reversible motor having a control winding connected to said output circuit, means adapted to impress on said input circuit a variable alternating current signal which is of relatively low frequency, means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition, high frequency signal detecting means operative when in a first condition to produce, and inoperative when in a second condition to produce a control effect on the non-appearance of the relatively high frequency signal in said output circuit, and means operative to change the condition of said detecting means from either of said first and second conditions to the other.

29. Apparatus as specified in claim 28, in which said detecting means includes an electronic valve having an anode, a cathode and a control electrode and includes means normally operative to vary the relative potentials of said cathode and control grid to make said valve conductive or non-conductive accordingly as said high frequency signal appears in, or disappears from said output circuit, and means operable to maintain said valve conductive notwithstanding the non-appearance of said high frequency signal in said output circuit.

30. The combination with electrical measuring and control apparatus comprising an electronic amplifier having an input circuit and an output circuit, measuring means connected to said input circuit and responsive to variations in the value of a variable quantity and adapted on a change in said quantity to impress an alternating current signal indicative of said change and of relatively low frequency on said input circuit, a mechanism connected to said output circuit and actuated by, and in selective accordance with, the relatively low frequency signal impressed on said input circuit, of means coupling said input and output circuits to transfer energy from said output circuit to said input circuit and thereby impress a relatively high frequency signal on the relatively low frequency signal impressed on said input circuit, the magnitude of the relatively low frequency signal being proportioned to carry the relatively high frequency signal through said amplifier when said appartus is in its normal operative condition and to attain a value high enough to cause the relatively high frequency signal to be clipped or cut off in said amplifier on the development of an apparatus defect preventing normal operation of said apparatus, control means normally operative to selectively respond to the appearance or non-appearance of said high frequency signal in said output circuit to produce a control effect when the relatively high frequency signal disappears from said output circuit, and means operable to prevent said control means from responding to the disappearance of said high frequency signal from said output circuit.

31. The combination with electrical measuring and control apparatus comprising an electronic amplifier having an input circuit and an output circuit, self balancing measuring means responsive to variations in the value of a variable quantity and adapted when connected to said input circuit to impress an alternating current signal indicative of a change in said quantity and of relatively low frequency on said input circuit, calibrating means responsive to variations in the operative condition of said measuring means and adapted when connected to said input circuit to impress thereon an alternating current signal indicative of a change in said condition from normal and of said relatively low frequency, switching means operable to alternately connect said measuring means and said calibrating means to said input circuit, a balancing mechanism connected to said output circuit for actuation by, and in selective accordance with a relatively low frequency signal impressed on said input circuit, of means coupling said input and output circuits to transfer energy from said output circuit to said input circuit and thereby superimpose a relatively high frequency signal on the relatively low frequency signal impressed on said input circuit, the magnitude of the relatively low frequency signal being proportioned to carry the relatively high frequency signal through said amplifier when said apparatus is in its normal operative condition and to attain a value high enough to cause the relatively high frequency signal to be clipped or cut off in said amplifier on the development of an apparatus defect preventing normal operation of said apparatus, control means normally operating to produce a control effect when the relatively high frequency signal disappears from said output circuit and means for rendering said control means inoperative to produce said control effect during periods in which said calibrating means is connected to said input circuit.

32. Apparatus as specified in claim 31, in which said control means has a time constant retarding the production of a control effect following the connection of the measuring means to said input circuit.

33. Apparatus as specified in claim 31, in which the means for rendering the said control means inoperative to produce said control effect and said switching means are operatively related so that said control means is rendered inoperative when said switching means is operated to connect said calibrating means to said input circuit.

34. Apparatus as specified in claim 31, which includes a normally closed door preventing access to said switching means, and in which the said means for rendering said control means inoperative comprises a switch actuated by said door when the latter is open to render said switching means accessible.

35. Apparatus as specified in claim 31, in which the said means for rendering said control means inoperative to produce said control effect during periods in which said calibrating means is connected to said input circuit, comprises switch contacts included in said switching means.

36. The combination with an electrical measuring and control instrument comprising an electronic amplifier having an input circuit and an output circuit, measuring means connected to said input circuit and responsive to variations in the value of a variable quantity and adapted on a change in said quantity to impress an alternating current signal indicative of said change and of relatively low frequency on said input circuit, and mechanism connected to said output circuit and actuated by, and in selective accordance with, the relatively low frequency signal impressed on said input circuit, of a protective mechanism unit separate from said instrument but connected thereto by cable, and comprising a transformer having a primary winding with terminal conductors included in said cable and connected to said output circuit, and having a secondary winding with terminals included in said cable and connected to said input circuit, whereby said transformer couples said input and output circuits for the transfer of energy from said output circuit to said input circuit and thereby does or does not superimpose a relatively high frequency signal on the relatively low frequency signal impressed on said input circuit accordingly as said instrument is or is not in its normal operative condition, said unit also including detector means connected to said primary winding and selectively responsive to the appearance in, and disappearance from said output circuit of said high frequency signal and means for producing a control effect on the disappearance of said high frequency signal from said output circuit.

37. A protective apparatus unit adapted for connection to a self-balancing measuring instrument having input and output circuits and including an electronic amplifying system between said input and output circuits, said unit comprising a transformer having a primary winding and terminal conductors adapted to connect said winding into said instrument output circuit, and having a secondary winding with terminal conductors adapted to connect said secondary winding into said instrument input circuit, high frequency signal detecting means connected to the first mentioned terminal conductors and responsive to high frequency current flow therein, and a relay mechanism controlled by said detecting means and producing a control effect on an interruption in said high frequency current flow.

38. A protective apparatus unit adapted for connection to a self-balancing measuring instrument of the known type having input and output circuits and including an electronic amplifying system between said input and output circuits, said unit comprising a first transformer having a primary winding and terminal conductors adapted to connect said winding into said instrument output circuit, and having a secondary winding with terminal conductors adapted to connect said secondary winding into said instrument input circuit, high frequency signal detecting means comprising an electronic detector valve having an anode and a cathode, a load resistor connected in series with said anode and cathode and said primary winding, a second transformer having primary and secondary windings and terminal conductors adapted to connect the primary winding to a source of alternating current of relatively low frequency, an electronic relay valve having an anode, a cathode and a control grid, a relay winding connected in series with the secondary winding of said second transformer and the anode and cathode of said relay valve, means connecting said control grid to the cathode of said detector valve, conductor means connecting the cathode of said relay valve to the cathode of the detector valve through said load resistor, a signal-controlling switch actuated by said relay winding, a short-circuiting conductor connected at one end to the cathode of the relay valve, a second short-circuiting conductor connected at one end to the cathode of said detector valve, said conductors being adapted for connection to a switch which, when closed, connects the cathode and control grid of said relay valve independently of said load resistor, a casing enclosing said unit, and a cable connected at one end to said casing and incorporating said conductors and adapted for connection at its opposite end to said instrument.

39. Apparatus including an amplifier having input and output circuits and adapted, when said apparatus is in an operative condition, to amplify signals applied to said input circuit and having frequencies lying within a given frequency range, means for coupling said input and output circuits together to cause said amplifier to produce oscillations having a frequency outside of said frequency range, and a device responsive to the failure of said amplifier to produce said oscillations as a result of inoperativeness of said apparatus.

40. Apparatus including an amplifier having input and output circuits and adapted, when said apparatus is in an operative condition, to amplify signals applied to said input circuit and having frequencies lying within a given frequency range, means for coupling said input and output circuits together to cause said amplifier to produce oscillations having a frequency outside of said frequency range, and a device responsive to the failure of said amplifier to produce said oscillations as a result of inoperativeness of said apparatus, said device including an electron discharge device operative to detect the existence of said oscillations.

41. Apparatus including an amplifier having input and output circuits and adapted, when said apparatus is in an operative condition, to amplify signals applied to said input circuit and having frequencies lying within a given frequency range, means for coupling said input and output circuits together to cause said amplifier to produce oscillations having a frequency outside of said frequency range, and a device responsive to the failure of said amplifier to produce said oscillations as a result of inoperativeness of said apparatus, said device including a detector operative to detect the existence of said oscillations and means to produce an indication upon the failure of said amplifier to produce said oscillations.

42. Apparatus including an amplifier having input and output circuits and adapted, when said apparatus is in an operative condition, to amplify signals applied to said input circuit and having frequencies lying within a given frequency range, means for coupling said input and output circuits together to cause said amplifier to produce oscillations having a frequency outside of said frequency range, and a device responsive to the failure of said amplifier to produce said oscillations as a result of inoperativeness of said apparatus, said device including a detector operative to detect the existence of said oscillations and means to produce a control effect upon the failure of said amplifier to produce said oscillations.

RUDOLF F. WILD.

No references cited.